(12) United States Patent
Nallasivam et al.

(10) Patent No.: US 11,520,746 B2
(45) Date of Patent: Dec. 6, 2022

(54) APPARATUS, SYSTEMS, AND METHODS FOR ACCELERATED REPLICATION OF FILE METADATA ON DIFFERENT SITES

(71) Applicant: International Business Machines Corporation, Armonk, NY (US)

(72) Inventors: Subramaniyan Nallasivam, Bangalore (IN); Robert B. Basham, Beaverton, OR (US); Harold Joseph Roberson, II, Rochester, MN (US); Ranjith Rajagopalan Nair, Carmelaram post (IN)

(73) Assignee: International Business Machines Corporation, Armonk, NY (US)

( * ) Notice: Subject to any disclaimer, the term of this patent is extended or adjusted under 35 U.S.C. 154(b) by 423 days.

(21) Appl. No.: 16/538,050

(22) Filed: Aug. 12, 2019

(65) Prior Publication Data
US 2021/0049130 A1 Feb. 18, 2021

(51) Int. Cl.
*G06F 16/178* (2019.01)
*G06F 16/21* (2019.01)
*G06F 9/48* (2006.01)

(52) U.S. Cl.
CPC .......... *G06F 16/178* (2019.01); *G06F 9/4881* (2013.01); *G06F 16/219* (2019.01)

(58) Field of Classification Search
CPC ..... G06F 16/178; G06F 9/4881; G06F 16/219
See application file for complete search history.

(56) References Cited

U.S. PATENT DOCUMENTS

| | | | |
|---|---|---|---|
| 5,187,750 A * | 2/1993 | Behera | G06Q 40/02 382/140 |
| 9,235,594 B2 | 1/2016 | Gupta et al. | |
| 10,210,115 B2 | 2/2019 | MacKenzie et al. | |
| 2002/0083056 A1* | 6/2002 | Armstrong | G06F 16/2343 |
| 2011/0145196 A1* | 6/2011 | Bender | G06F 16/185 707/640 |
| 2012/0089710 A1* | 4/2012 | Rakowski | H04L 67/125 709/220 |
| 2014/0074790 A1* | 3/2014 | Berman | G06F 11/1448 707/649 |
| 2014/0089671 A1* | 3/2014 | Logue | H04L 63/08 713/182 |
| 2015/0363276 A1 | 12/2015 | Banerjee et al. | |
| 2016/0246688 A1 | 8/2016 | Chainani et al. | |
| 2016/0357778 A1* | 12/2016 | MacKenzie | G06F 13/36 |
| 2017/0034310 A1* | 2/2017 | Victorelli | G06F 9/547 |

(Continued)

*Primary Examiner* — Cam Y T Truong
(74) *Attorney, Agent, or Firm* — Kunzler Bean & Adamson

(57) ABSTRACT

Methods that can accelerate replication of file metadata on different sites are disclosed herein. One method includes recreating, by a processor, a transaction history for a predetermined period of time for a set of consumer sites of a first storage network and synchronizing data in the set of consumer sites and a new consumer site added to the first storage network utilizing a cloud scale persistent message bus. In this method, the data is synchronized based on the recreated transaction history during the predetermined period of time and current transactions performed on each consumer site in the set of consumer sites. Apparatus, systems, and computer program products that can include, perform, and/or implement the methods are also disclosed herein.

17 Claims, 14 Drawing Sheets

(56) References Cited

U.S. PATENT DOCUMENTS

| | | | |
|---|---|---|---|
| 2017/0068566 A1* | 3/2017 | Hosie | G06F 9/4881 |
| 2017/0344432 A1* | 11/2017 | Wu | G06F 11/1451 |
| 2018/0295226 A1* | 10/2018 | Mamdani | H04M 1/72445 |
| 2019/0347351 A1* | 11/2019 | Koomthanam | G06F 16/178 |
| 2020/0133786 A1* | 4/2020 | Ramabhadran | G06F 16/1815 |
| 2020/0183603 A1* | 6/2020 | Takla | G06F 13/362 |

* cited by examiner

APPARATUS, SYSTEMS, AND METHODS FOR ACCELERATED REPLICATION OF FILE METADATA ON DIFFERENT SITES

FIELD

The subject matter disclosed herein relates to computing systems and, more particularly, relates to apparatus, systems, and methods that can accelerate replication of file metadata on different sites.

BACKGROUND

Conventional scale-out storage systems can resolve the problem of unpredictable requirements by incrementally adding capacity and performance based on organization needs. One challenge with scale-out storage solutions can include multiple sites looking to distribute data either for collaboration or disaster recovery. If the data is migrated to a cloud network, synchronizing the data across all of the sites in a cluster can present a challenge because synchronization typically occurs via eventing. Quickly synchronizing the data stored across all of the sites of a storage system with a newly added site can be a challenge that at least some scale-out storage systems face whenever a new site is added to the storage system.

BRIEF SUMMARY

Apparatus, systems, and methods that can accelerate replication of file metadata on different sites are provided. One apparatus includes a reconstruction module that recreates a transaction history for a predetermined period of time for a set of consumer sites of a first storage network and a bus module that provides a cloud scale persistent message bus for the first storage network. In some embodiments, the cloud scale persistent message bus is configured to synchronize data in the set of consumer sites and a new consumer site added to the first storage network based on the recreated transaction history during the predetermined period of time and current transactions performed on each consumer site in the set of consumer sites. In additional or alternative embodiments, at least a portion of the service action module, the object module, and/or the notification module comprises one or more of a set of hardware circuits, a set of programmable hardware devices, and/or executable code stored on a set of non-transitory computer-readable storage media.

A method includes recreating, by a processor, a transaction history for a predetermined period of time for a set of consumer sites of a first storage network and synchronizing data in the set of consumer sites and a new consumer site added to the first storage network utilizing a cloud scale persistent message bus. In one method, the data is synchronized based on the recreated transaction history during the predetermined period of time and current transactions performed on each consumer site in the set of consumer sites.

One computer program product includes a computer-readable storage medium including program instructions embodied therewith. The program instructions are executable by a processor to cause the processor to recreate a transaction history for a predetermined period of time for a set of consumer sites of a first storage network and synchronize data in the set of consumer sites and a new consumer site added to the first storage network utilizing a cloud scale persistent message bus. In some program instructions, the data is synchronized based on the recreated transaction history during the predetermined period of time and current transactions performed on each consumer site in the set of consumer sites.

BRIEF DESCRIPTION OF THE DRAWINGS

So that at least some advantages of the technology may be readily understood, more particular descriptions of the embodiments briefly described above are rendered by reference to specific embodiments that are illustrated in the appended drawings. Understanding that the drawings included herein only depict some embodiments, the embodiments discussed herein are therefore not to be considered as limiting the scope of the technology. That is, the embodiments of the technology that are described and explained herein are done with specificity and detail utilizing the accompanying drawings, in which.

DETAILED DESCRIPTION

Figure 1:
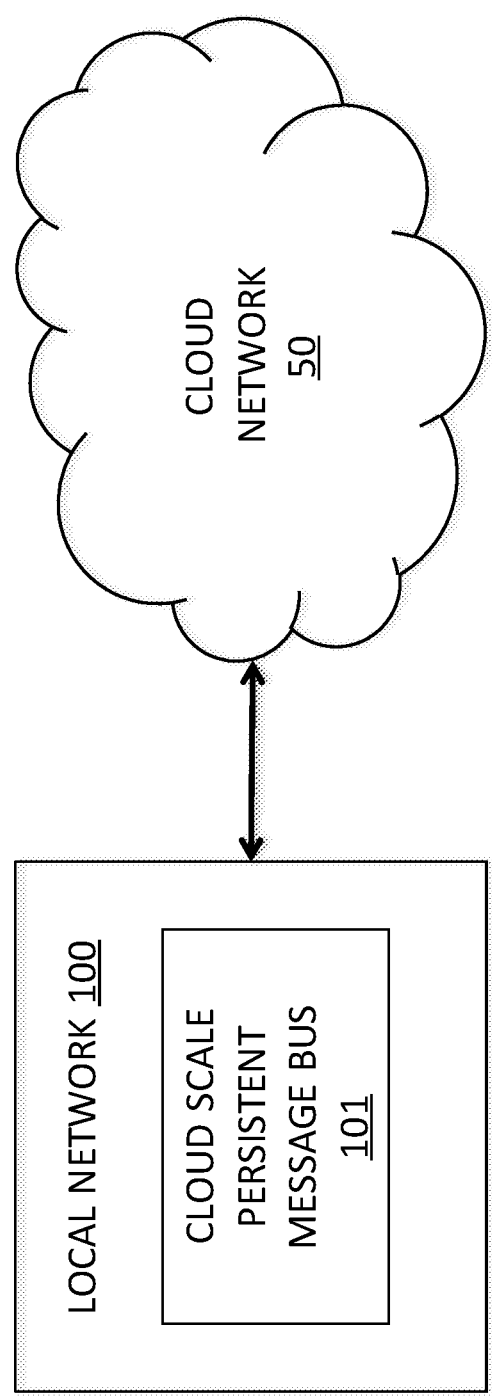
FIG. 1 is a block diagram of one embodiment of a set of computing networks coupled to and/or in communication with one another.

Disclosed herein are various embodiments providing apparatus, systems, methods, and computer program products that can accelerate replication of file metadata on different sites. Notably, the language used in the present disclosure has been principally selected for readability and instructional purposes, and not to limit the scope of the subject matter disclosed herein in any manner.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "including," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more," unless expressly specified otherwise.

In addition, as used herein, the term "set" can mean "one or more," unless expressly specified otherwise. The term "sets" can mean multiples of or a plurality of "one or mores," "ones or more," and/or "ones or mores" consistent with set theory, unless expressly specified otherwise.

Further, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

The present technology may be a system, a method, and/or a computer program product. The computer program product may include a computer-readable storage medium (or media) including computer-readable program instructions thereon for causing a processor to carry out aspects of the present technology.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove including instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fibre-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibres, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present technology may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). To perform aspects of the present technology, in some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry.

Aspects of the present technology are described herein with reference to flowchart illustrations and/or block diagrams of methods, apparatus (systems), and computer program products according to embodiments of the technology. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium including instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present technology. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

To more particularly emphasize their implementation independence, many of the functional units described in this specification have been labeled as modules. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program instructions may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

The schematic flowchart diagrams and/or schematic block diagrams in the Figures illustrate the architecture, functionality, and operation of possible implementations. It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Although various arrow types and line types may be employed in the flowchart and/or block diagrams, they are understood not to limit the scope of the corresponding embodiments. Indeed, some arrows or other connectors may be used to indicate only an exemplary logical flow of the depicted embodiment.

The description of elements in each figure below may refer to elements of proceeding figures. For instance, like numbers can refer to similar elements in all figures, including alternate embodiments of similar elements.

With reference now to the drawings, FIG. 1 is a block diagram of one embodiment of a set of networks coupled to and/or in communication with one another. At least in the illustrated embodiment, the set of networks includes, among other networks, a cloud network 50 and a local network 100.

A cloud network 50 may include any suitable cloud network (IAN) that is known or developed in the future that can store data. In various embodiments, the cloud network 50 can include any quantity of computing devices and/or type of computing device that is/are capable of storing data. In some embodiments, the cloud network 50 further stores the data that is stored in and/or utilized by the local network 100.

In some embodiments, the local network 100 transmits full sets of data to the cloud network 50 for storage in the cloud network 50. Further, the local network 100 stores therein metadata representing the full sets of the data that the local network 100 transmitted to the cloud network 500 for persistent storage in the cloud network 50. In addition, the local network 100 is configured to transmit data requests to the cloud network 50 and receive the full sets of data stored in the cloud network 50 in response to the data requests.

The local network 100 may be any suitable wired and/or wireless network (e.g., public and/or private computer networks in any number and/or configuration (e.g., the Internet, an intranet, a cloud network, etc.)) that is known or developed in the future that enables a set of storage devices to be coupled to and/or in communication with one another and/or to share resources. In various embodiments, the local network 100 can include a cloud network (IAN), a SAN (e.g., a storage area network, a small area network, a server area network, and/or a system area network), a wide area network (WAN), a local area network (LAN), a wireless local area network (WLAN), a metropolitan area network (MAN), an enterprise private network (EPN), a virtual private network (VPN), and/or a personal area network (PAN), among other examples of computing networks and/or or sets of computing devices connected together for the purpose of sharing resources that are possible and contemplated herein.

In various embodiments, the local network 100 accesses the cloud network 50 via the Internet, among other networking protocols that are possible and contemplated herein. That is, the local network 100 is configured to utilize the Internet to transmit data to and/or receive data from the cloud network 50.

As shown in the illustrated embodiment, the local network 100 includes, among other components, a cloud scale persistent message bus 101. The cloud scale persistent message bus 101 may include any suitable hardware and/or software that is capable of building data pipelines and/or streaming applications for accelerating replication of file metadata on different sites. In some embodiments, the cloud scale persistent message bus 101 includes a Kafka® bus, among other mechanisms that are capable of building data pipelines and/or streaming applications for accelerating replication of file metadata on different sites.

Figure 2:
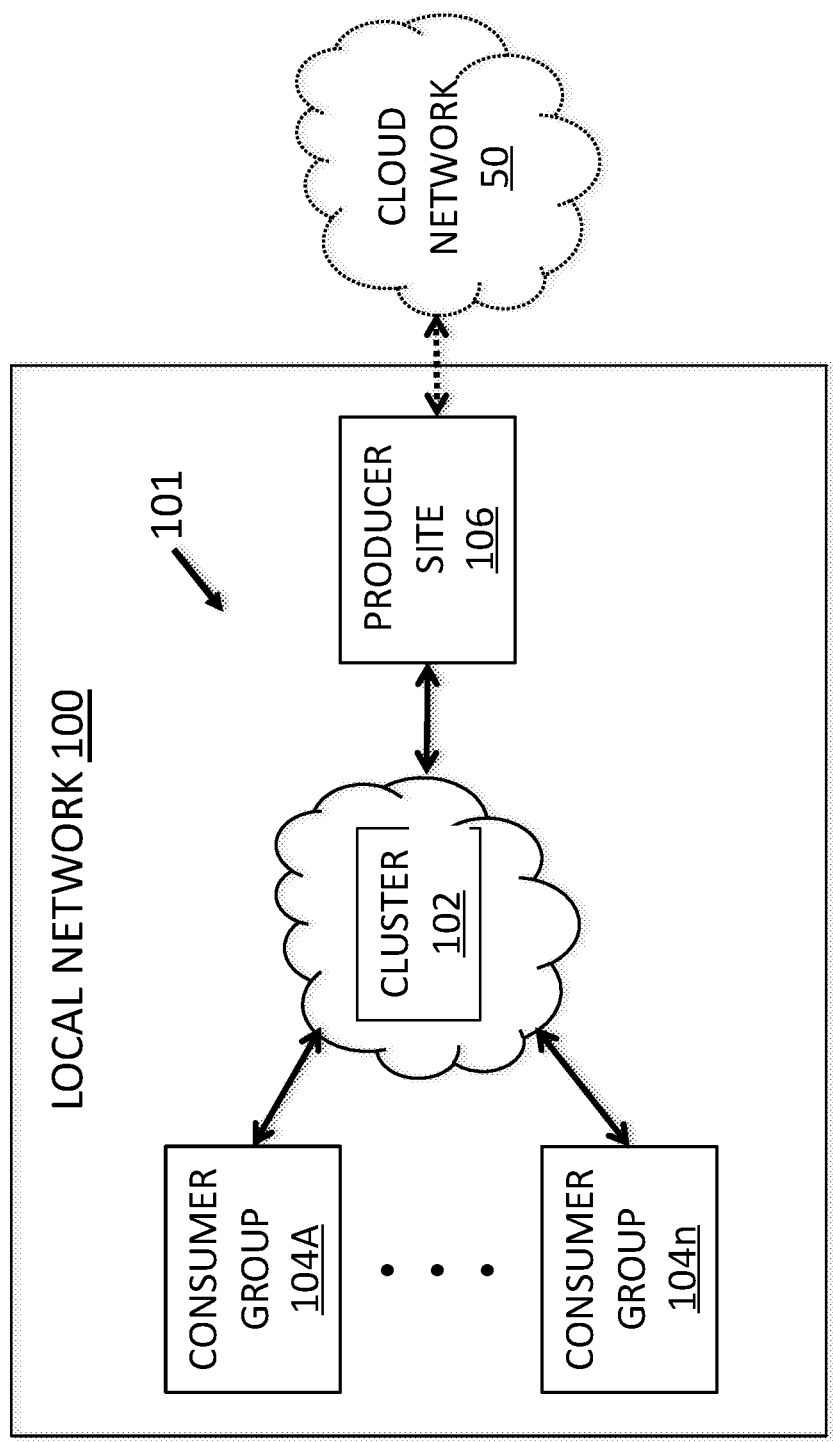
FIG. 2 is a block diagram of one embodiment of a local network included in the set of computing networks of FIG. 1.

Referring to FIG. 2, FIG. 2 is a block diagram of one embodiment of a local network 100 (or system). The local network 100 may be any suitable network that is known or developed in the future capable of storing and/or utilizing data. In some embodiments, the local network 100 is a storage network, among other types of networks that are possible and contemplated herein.

At least in the illustrated embodiment, the local network 100 includes, among other components, a cloud scale persistent message bus 101. The cloud scale persistent message bus 101 includes, among other components, a cluster of computing devices 102 (also simply referred to as cluster 102) coupled to and/or in communication with a set of groups of consumer sites 104A through 104n (also simply referred individually, in various groups, or collectively as consumer group(s) 104) and a producer site 106.

Figure 3:
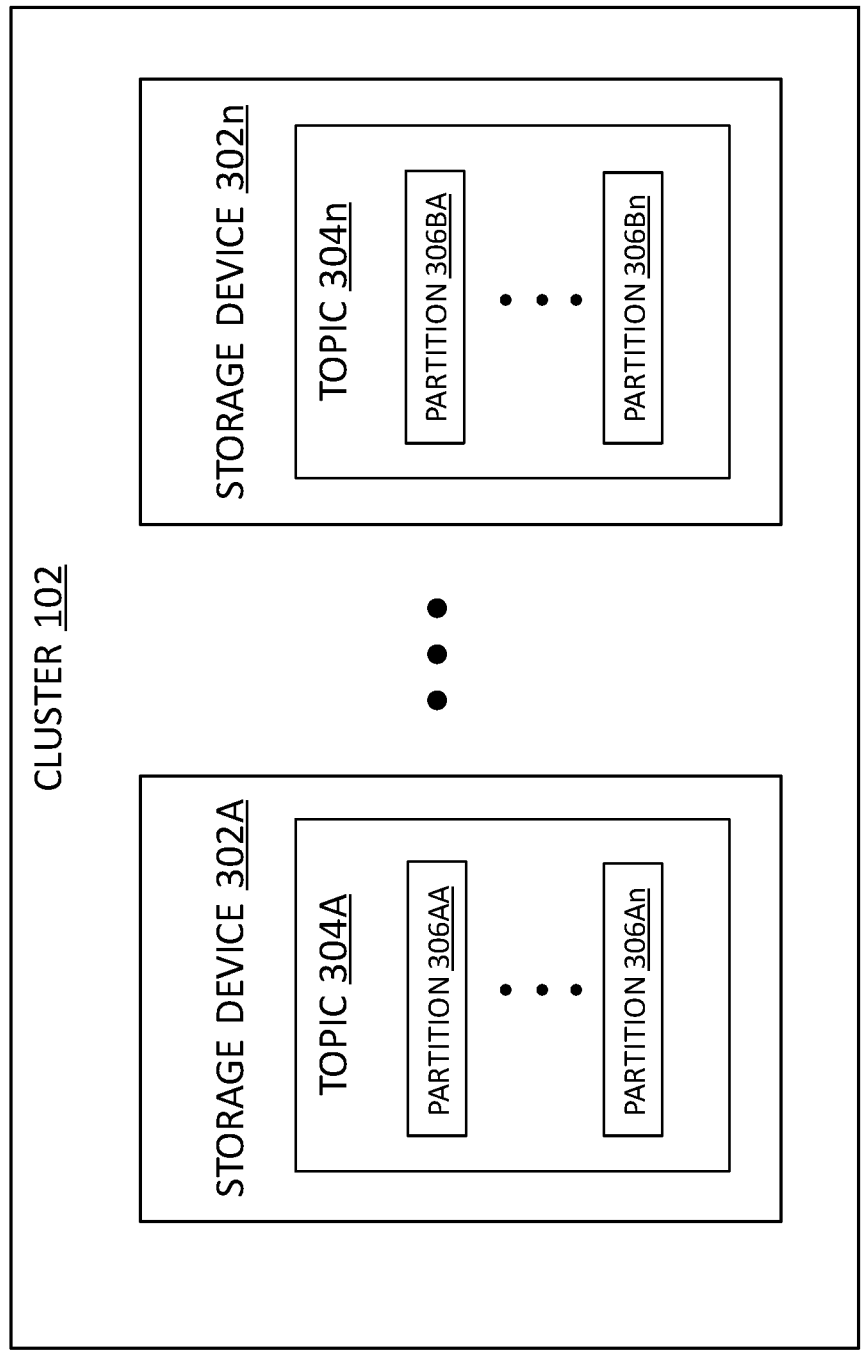
FIG. 3 is a block diagram of one embodiment of a cluster of storage devices included in the local network of FIG. 2.

With reference to FIG. 3, FIG. 3 is a block diagram of one embodiment of a cluster 102 included in the cloud scale persistent message bus 101 of the local network 100 illustrated in FIG. 2. At least in the illustrated embodiment, the cluster 102 includes, among other components, a set of storage devices 302A through 302n (also simply referred individually, in various groups, or collectively as storage device(s) 202) coupled to and/or in communication with one another.

A storage device 302 may include any suitable type of device and/or system that is known or developed in the future that can store computer-useable data. In various embodiments, a storage device 302 is a storage server including one or more non-transitory computer-usable mediums (e.g., readable, writable, etc.), which may include any non-transitory and/or persistent apparatus or device that can contain, store, communicate, propagate, and/or transport instructions, data, computer programs, software, code, routines, etc., for processing by or in connection with a computer processing device. In some embodiments, the storage device 302 includes an array of hard drives.

A storage device 302 may include any suitable size that can provide storage space for one or more storage applications for a set of consumer sites 104. Further, a storage device 302 can store data in a set of data blocks, data segments, and/or data chunks including any suitable size that is known or developed in the future.

Further, the cluster 102 may include any suitable quantity of storage devices 302. That is, while FIG. 3 illustrates the cluster 102 as including two (2) storage devices 302, the cluster 102 is not limited to two storage devices 302. As such, the cluster 102 may include one (1) storage device 302 or any quantity of storage devices 302 greater than two storage devices 302.

In various embodiments, the storage devices 302 can store a topic 304 for the cloud scale persistent message bus 101. At least in the illustrated embodiment, the storage device 302A stores a topic 304A and the storage device 302n stores a topic 304n.

Topics 304A and 304n (also simply referred individually, in various groups, or collectively as topic(s) 304) may include a category/feed name to which messages are stored and published. Messages can be byte arrays that can store any suitable object in any suitable format.

In various embodiments, messages transmitted within the local network 100 are organized into topics 304. That is, messages (e.g., streams of records) within the local network 100 are transmitted to and received from specific topics 304. As discussed elsewhere herein, the producer site 106 can write data to the topics 304 and the consumer groups 104 (and consumer sites 402 (see FIG. 4)) read from the topics 304. Messages published to the cluster 102 will stay in the cluster 102 until a configurable and/or predetermined retention period of time expires. In some embodiments, all of the messages are retained and/or stored for the predetermined amount of time.

In some embodiments, the topic 304A is a management-request topic (e.g., a mgmt.-request topic) and the topic 304n is a management-response topic (e.g., a mgmt.-response topic) or vice-versa (e.g., the topic 304A is the mgmt.-response topic and the topic 304n is the mgmt.-request topic). The mgmt.-request topic (e.g., the topic 304A) and the mgmt.-response topic (e.g., the topic 304n), in various embodiments, provide a request/response channel between the producer site 106 and the consumer groups 104 (and consumer sites 402 (see FIG. 4)).

Figure 4:
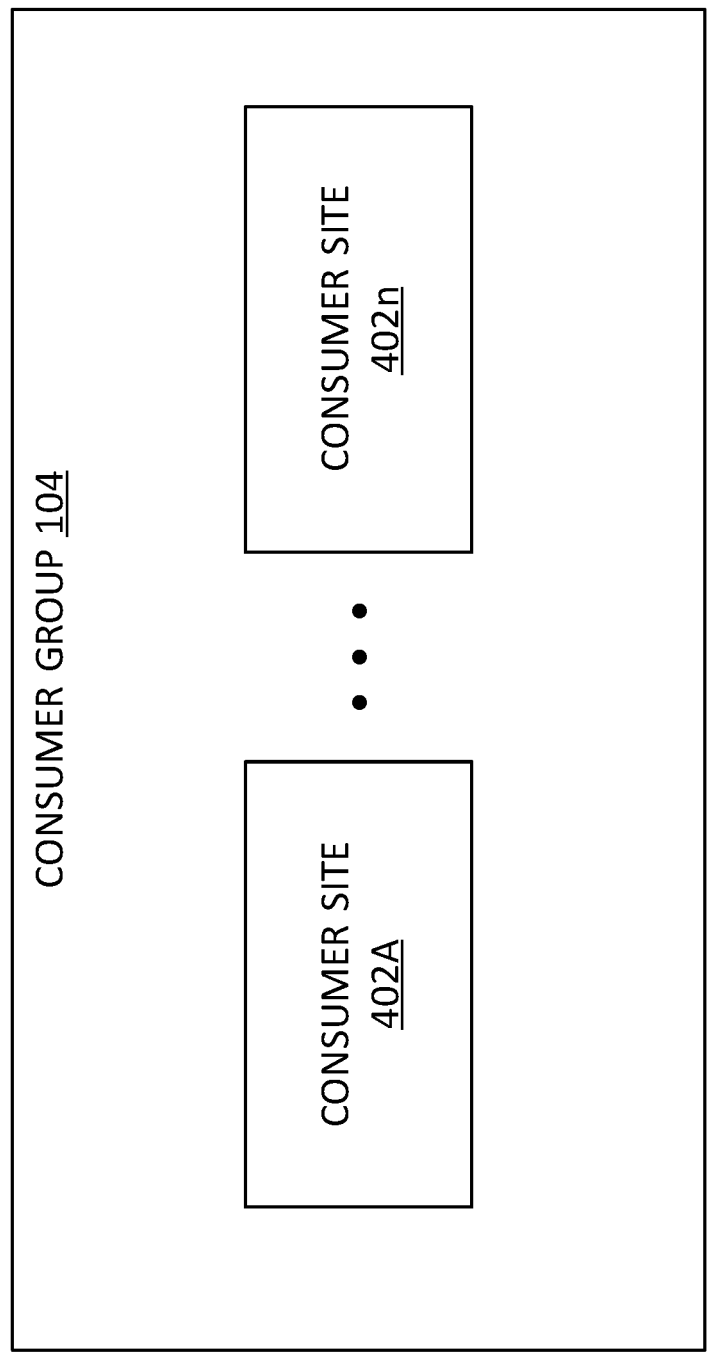
FIG. 4 is a block diagram of one embodiment of a consumer group (e.g., a group of consumer sites) included in the local network of FIG. 2.

Any suitable quantity of topics 304 may be utilized in the cloud scale persistent message bus 101. That is, while FIG. 4 illustrates the set of storage devices 302 as storing two (2) topics 304 for the cloud scale persistent message bus 101, the cloud scale persistent message bus 101 is not limited to utilizing two topics 304. As such, the cloud scale persistent message bus 101 may utilize any quantity of topics 304 greater than two topics 304.

As illustrated in FIG. 3, each topic 304 is divided into a quantity of partitions 306. Specifically, the topic 304A (e.g., a mgmt.-request topic) is divided into partitions 306AA through 306An (also simply referred individually, in various groups, or collectively as partition(s) 306A) and the topic 304n (e.g., a mgmt.-response topic) is divided into partitions 306BA through 306Bn (also simply referred individually, in various groups, or collectively as partition(s) 306B).

Partitions 306A and 306B may include any suitable quantity of partitions 306A and 306B, respectively. That is, while FIG. 3 illustrates the topic 304A as including two (2) partitions 306A, the topic 304A is not limited to two partitions 306A. As such, the topic 304A may include one (1) partition 306A or any quantity of partitions 306A greater than two partitions 306A. Similarly, while FIG. 3 illustrates the topic 304n as including two (2) partitions 306B, the topic 304n is not limited to two partitions 306B. As such, the topic 304n may include one (1) partition 306B or any quantity of partitions 306B greater than two partitions 306B.

Partitions 306A and 306B store messages in an unchangeable sequence. Each message stored in partitions 306A and 306B is assigned and identified by a unique offset. A topic 304 can also include multiple partition logs that allows for multiple consumers to read from a particular topic 304 in parallel. In various embodiments, metadata replication in the local network 100 is implemented at the partition level.

Referring to FIG. 4, FIG. 4 is a block diagram of one embodiment of a consumer group 104 included in the cloud scale persistent message bus 101 of the local network 100 illustrated in FIG. 2. At least in the illustrated embodiment, a consumer group 104 includes a set of consumer sites 402A through 402n (also simply referred individually, in various groups, or collectively as consumer site(s) 402) that are subscribing to a specific topic 304.

Each consumer site 402 can read messages starting from a specific offset and are allowed to read from any offset point of a topic 304, which allows a new consumer 402 to join the cluster 102 at any point in time. Each consumer 402 in the group is assigned a set of partitions from which to consume. They will receive messages from a different subset of the partitions in the topic. In some embodiments, the cloud scale messaging bus 101 (e.g., a Kafka bus) can guarantee that a message is only read by a single consumer in the group.

In various embodiments, different consumer sites 402 can be responsible for different partitions. That is, a consumer site 402 can pull and/or read messages from one or more partitions 306A of the topic 304A or from one or more partitions 306B of the topic 304n. In some embodiments, the consumer sites 402 can operate and/or function in parallel so that multiple consumer sites 402 can read from multiple partitions on a topic (e.g., the partitions 306A of the topic 304A and the partitions 306B of the topic 304n).

Any suitable quantity of consumer sites 402 may be included in a consumer group 104. That is, while FIG. 4 illustrates a consumer group 104 as including two (2) consumer sites 402, the consumer group 104 is not limited to two consumer sites 402. As such, the consumer group 104 may include one (1) consumer site 402 or any quantity of consumer sites 402 greater than two consumer sites 402.

Figure 5:
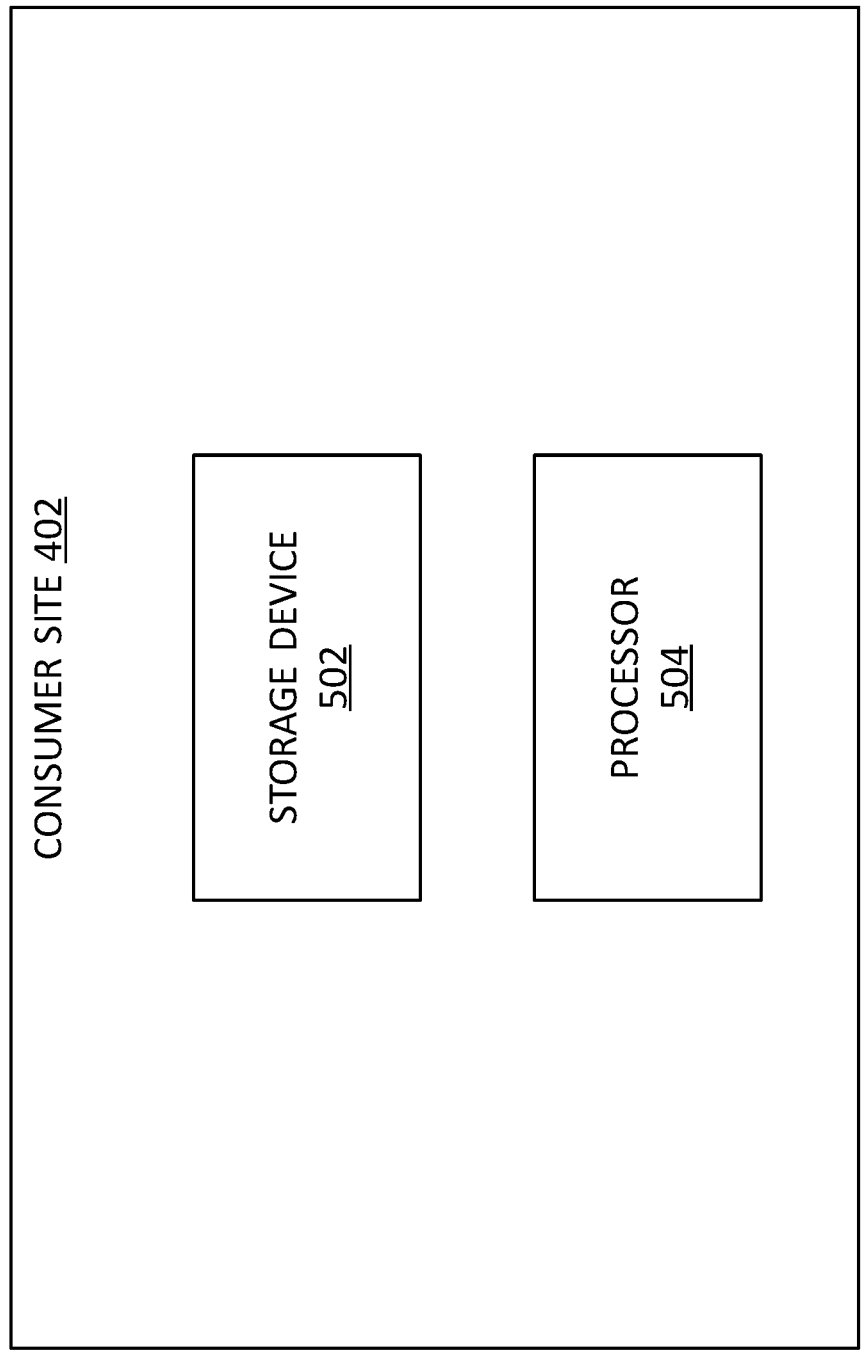
FIG. 5 is a block diagram of one embodiment of a consumer site included in the consumer group of FIG. 4.

With reference to FIG. 5, FIG. 5 is a block diagram of one embodiment of a consumer site 402 included in a consumer group 104. A consumer site 402 can include any suitable computing hardware and/or software capable of accessing the cluster 102. At least in the illustrated embodiment, a consumer site 402 includes, among other components, a storage device 502 coupled to and/or in communication with a processor 504.

A storage device 502 may include any suitable type of device and/or system that is known or developed in the future that can store computer-useable data. In various embodiments, a storage device 502 may include one or more non-transitory computer-usable mediums (e.g., readable, writable, etc.), which may include any non-transitory and/or persistent apparatus or device that can contain, store, communicate, propagate, and/or transport instructions, data, computer programs, software, code, routines, etc., for processing by or in connection with a computer processing device.

In some embodiments, a storage device 502 may be implemented as a direct-access storage device (DASD). A storage device 502, in further embodiments, may include other types of non-transitory memory such as, for example, flash memory (e.g., a solid-state devices (SSD) or other non-volatile storage devices that store persistent data), a dynamic random access memory (DRAM) device, an enhanced dynamic random access memory (EDRAM) device, a static random access memory (SRAM) device, a hard disk drive (HDD), a near-line drive, tape drive (e.g., magnetic and/or virtual), and/or other type(s) of memory devices (e.g., non-volatile and/or persistent), etc. that are possible and contemplated herein.

A storage device 502 may include any suitable size that can provide storage space for one or more storage applications. A storage device 502, in various embodiments, can include a size in the range of about four kilobytes (4 KB) to about one hundred terabytes (100 TB), among other sizes that are possible and contemplated herein. In some embodiments, a storage device 502 can include a size of about one terabyte (1 TB), among other sizes that are possible and contemplated herein.

A processor 504 may include any suitable non-volatile/persistent hardware and/or software configured to perform and/or facilitate storing, reading, writing, and/or analyzing streaming data as a portion of the cloud scale persistent message bus 101. In various embodiments, a processor 504 may include hardware and/or software that can read and/or receive data (e.g., a record) published to a topic 304 associated with the consumer site 402 (and consumer group 104).

A processor 504 may further include hardware and/or software for executing instructions in one or more modules and/or applications that can accelerate replication of file metadata on different sites. Specifically, a processor 504 can be configured to enable the consumer site 402 to be synchronized in a more efficient manner with a consumer group 104, a cloud scale persistent message bus 101, and/or a local network 100 when the consumer site 402 is added thereto. In some embodiments, the consumer site 402 is synchronized in a more efficient manner in terms of an accelerated amount of time, among other efficiencies that are possible and contemplated herein.

Figure 6:
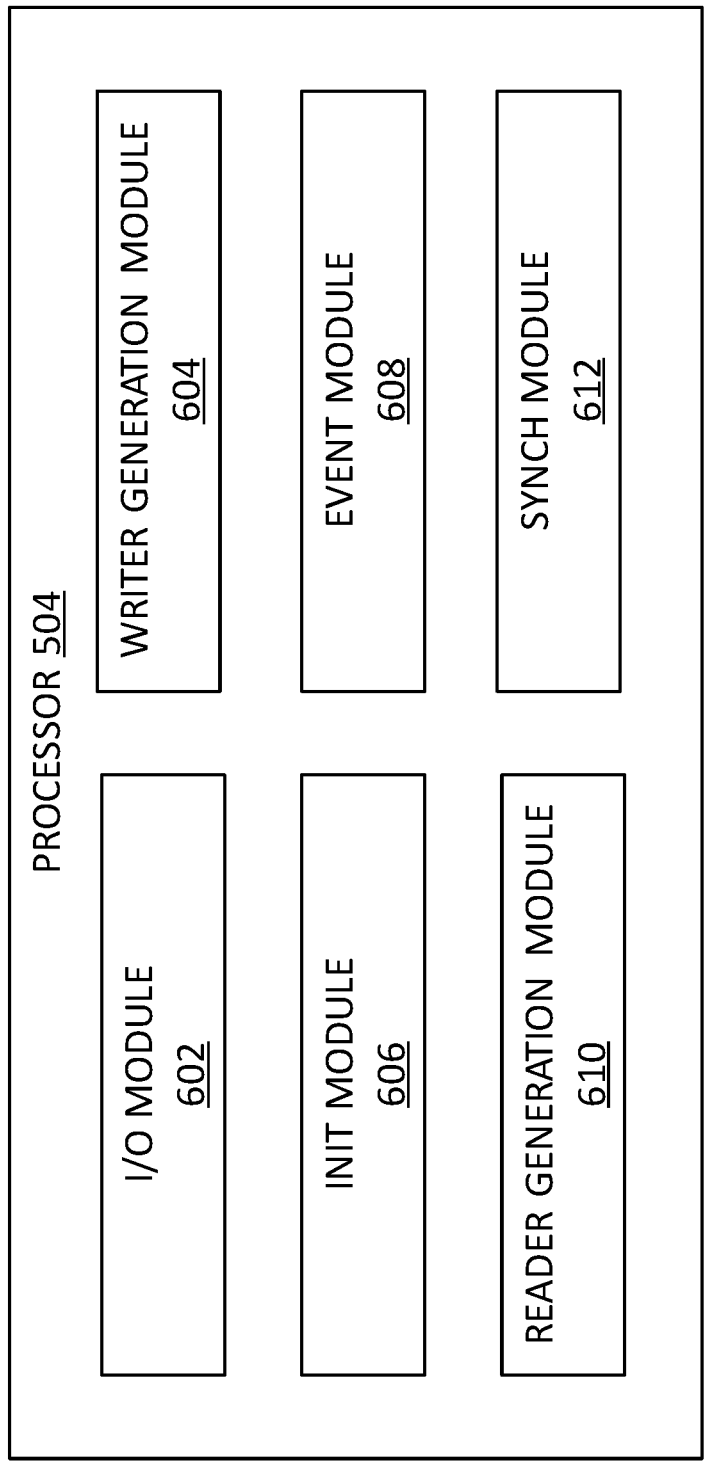
FIG. 6 is a block diagram of one embodiment of a processor included in the consumer site of FIG. 5.

Referring to FIG. 6, FIG. 6 is a block diagram of one embodiment of a processor 504 included in a consumer site 402. At least in the illustrated embodiment, a processor 504 includes, among other components, an input/output (I/O) module 602, a writer generation module 604, an initialization (INIT) module 606, an event module 608, a reader create module 610, and a synchronization (SYNCH) module 612.

An I/O module 602 may include any suitable hardware and/or software that can perform input and/or output operations in a consumer group 104, a cloud scale persistent message bus 101, and/or a local network 100. In various embodiments, the I/O module 602 in configured to send I/O requests to a cluster 102, a producer site 106, and/or one or more other consumer sites 402. For instance, the I/O module 602 can transmit I/O requests within the local network 100 to read, write, store, communicate, propagate, and/or transport instructions, data, computer programs, software, code, routines, etc. In various embodiments, the I/O module 602 can communicate with the cluster 102, the producer site 106, and/or the consumer site(s) 402 so that the writer generation module 604, the INIT module 606, the event module 608, the reader create module 610, and/or the synchronization module 612 can perform their various functions and/or operations.

A writer generation module 604 may include any suitable hardware and/or software that can create, generate, and/or initialize a writer entity on a consumer site 402. In various embodiments, the writer generation module 604 creates the writer entity in response to the consumer site 402 being added to or newly added to a consumer group 104, a cloud scale persistent message bus 101, and/or a local network 100. In some embodiments, the writer generation module 604 creates the writer entity upon the consumer site 402 being added to the consumer group 104, the cloud scale persistent message bus 101, and/or the local network 100. In further embodiments, the writer entity includes and/or forms at least a portion of an INIT module 606.

An INIT module 606 may include any suitable hardware and/or software that can write requests to a mgmt.-request topic (e.g., topic 304A) created by the producer site 106, as discussed elsewhere herein. In some embodiments, the INIT module 606 writes one or more initialization requests to the mgmt.-request topic (e.g., topic 304A).

An initialization request may include data and/or information about the consumer site 402 that can enable the producer site 106 that created the mgmt.-request topic 304A to identify and/or recognize the consumer site 402. In response to identifying and/or recognizing, the producer site 106 is able to grant permission to the consumer site 402 to access and/or write to the mgmt.-request topic 304A. In some embodiments, permission to access and/or write to the mgmt.-request topic 304A is granted to the consumer site 402 via the producer site 106 transmitting a handshake acknowledgement (ACK) signal to the mgmt.-request topic 304A.

In additional embodiments, the handshake acknowledgement signal is further transmitted to and received by the consumer site 402 via the INIT module 606. The INIT module 606 is further configured to transmit the handshake acknowledgement signal to the event module 608.

In some embodiments, the initialization request further includes a configuration query or request. The configuration query requests that the producer site 106 notify the new consumer site 402 of the configuration (e.g., quantity of consumer sites 402) of the consumer group 104 into which the new consumer site 402 is going to be added.

An event module 608 may include any suitable hardware and/or software that can request data be transmitted to the consumer site 402. The event module 608, in some embodiments, transmits the request for data is transmitted to the consumer site 402 in response to the event module 608 receiving a handshake acknowledgement signal from an INIT module 606.

In various embodiments, the event module 608 is configured to transmit a DATA request to a producer site 106. In some embodiments, the DATA request is transmitted via writing an event to a mgmt.-request topic (e.g., topic 304A).

A reader generation module 610 may include any suitable hardware and/or software that can create, generate, and/or initialize a reader entity for a consumer site 402. In some embodiments, the reader generation module 610 generates the reader entity in response to the event module 608 transmitting a DATA request to a producer site 106 and/or writing an event to a mgmt.-request topic (e.g., topic 304A).

In various embodiments, the reader entity is configured to listen for events on a mgmt.-response topic (e.g., topic 304n) and determine which events are relevant to synchronizing the consumer site 402 with one or more other consumer sites 402 when the consumer site 402 is newly added to a consumer group 104, a cloud scale persistent message bus 101, and/or a local network 100. In some embodiments, the events on the mgmt.-response topic may include data from the producer site 106 that the producer site 106 has been recreated from the transaction history of one or more consumer sites 402 in a consumer group 104. The events may further include current data from the consumer site(s) 402 in the consumer group 104 broadcast across the cloud scale persistent message bus 101 via the mgmt.-response topic (e.g., topic 304n).

A SYNCH module 612 may include any suitable hardware and/or software that can synchronize a new consumer site 402 with the one or more other consumer sites 402 in a consumer group 104. In some embodiments, the SYNCH module 612 retrieves the relevant events, as determined by the reader entity, from the mgmt.-response topic 304n.

The SYNCH module 612, in various embodiments, is configured to process each relevant event to extract the associated data utilizing a new thread for each respective event. The SYNCH module 612 stores the data that is extracted from each relevant event in the storage device 502.

In various embodiments, each relevant event is associated with one batch of data in a set of batches of data utilized to synchronize and/or build a new consumer site 402 so that the new consumer site 402 stores and/or includes the same data that is stored/included in one or more other consumer sites 402 of a consumer group 104. That is, the SYNCH module 612 is configured to store each batch of data that is received via the mgmt.-response topic (e.g., topic 304n) to the storage device 502.

The reader entity and the SYNCH module 612 continue to respectively listen and synchronize the data in the relevant events until the reader entity and/or the SYNCH module 612 detect and/or determine that a relevant event includes an indication that this event includes the last or final batch of data in a set of batches utilized to synchronize the new consumer site 402. In some embodiments, the indication includes a batch flag that is set to TRUE (or "1"). Further, the batch flag in other batches of data that is/are not the last or final batch may include a batch flag that is set to FALSE (or "0").

Figure 7:
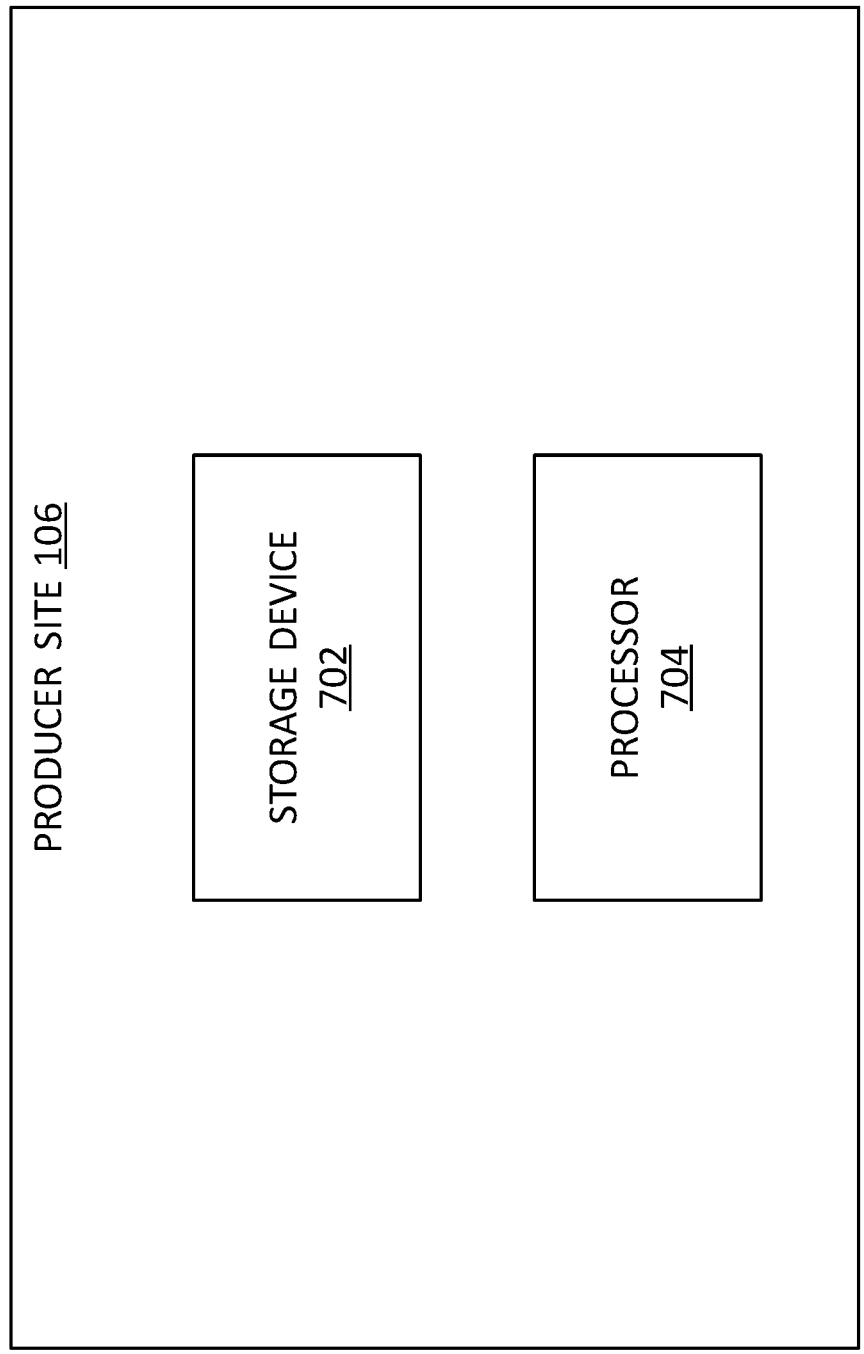
FIG. 7 is a block diagram of one embodiment of a producer site included in the local network of FIG. 2.

With reference to FIG. 7, FIG. 7 is a block diagram of one embodiment of a producer site 106 included in a cloud scale persistent message bus 101. A producer site 106 can include any suitable computing hardware and/or software capable of accessing the cluster 102 and/or the cloud network 50 to accelerate the synchronization of one or more new consumer sites 402.

At least in the illustrated embodiment, a producer site 106 includes, among other components, a storage device 702 coupled to and/or in communication with a processor 704. In various embodiments, the producer site 106 utilizes the storage device 702 and the processor 704 to accelerate the synchronization of one or more new consumer site 402 when the new consumer site(s) 402 is/are added to the local network 100, the cloud scale persistent message bus 101, and/or a particular consumer group 104. In some embodiments, the producer site 106 is configured to synchronize two or more new consumer sites 402 in parallel (e.g., at the same time or at substantially the same time), both when the new consumer sites 402 are being added the same consumer group 104 or are being added to different consumer groups 104.

A storage device 702 may include any suitable type of device and/or system that is known or developed in the future that can store computer-useable data. In various embodiments, a storage device 702 may include one or more non-transitory computer-usable mediums (e.g., readable, writable, etc.), which may include any non-transitory and/or persistent apparatus or device that can contain, store, communicate, propagate, and/or transport instructions, data, computer programs, software, code, routines, etc., for processing by or in connection with a computer processing device.

In some embodiments, a storage device 702 may be implemented as a DASD. A storage device 702, in further embodiments, may include other types of non-transitory memory such as, for example, flash memory (e.g., a SSD or other non-volatile storage devices that store persistent data), a DRAM device, an EDRAM device, a SRAM device, a HDD, a near-line drive, tape drive (e.g., magnetic and/or virtual), and/or other type(s) of memory devices (e.g., non-volatile and/or persistent), etc. that are possible and contemplated herein.

A storage device 702 may include any suitable size that can provide storage space for one or more storage applications. A storage device 702, in various embodiments, can include a size in the range of about 4 KB to about 100 TB, among other sizes that are possible and contemplated herein. In some embodiments, a storage device 702 can include a size of about 1 TB, among other sizes that are possible and contemplated herein.

In various embodiments, the storage device 702 is configured to store metadata. The metadata stored in the storage device 702, in some embodiments, is associated with and/or represents data stored in the local network 100 that is transmitted to the cloud network 50 for long-term storage therein, as discussed elsewhere herein.

A processor 704 may include any suitable non-volatile/persistent hardware and/or software configured to perform and/or facilitate storing, reading, writing, and/or analyzing streaming data as a portion of the cloud scale persistent message bus 101. In various embodiments, a processor 704 may include hardware and/or software that can read and/or write data to generate two or more published topics 304 (e.g., topic 304A (mgmt.-request topic) and topic 304n (mgmt.-response topic)).

A processor 704 may further include hardware and/or software for executing instructions in one or more modules and/or applications that can accelerate replication of file metadata on different sites. Specifically, a processor 704 can be configured to enable the producer site 106 to synchronize one or more new consumer sites 402 with a consumer group 104, a cloud scale persistent message bus 101, and/or a local network 100 in a more efficient manner when the consumer site(s) 402 is/are added thereto.

Figure 8:
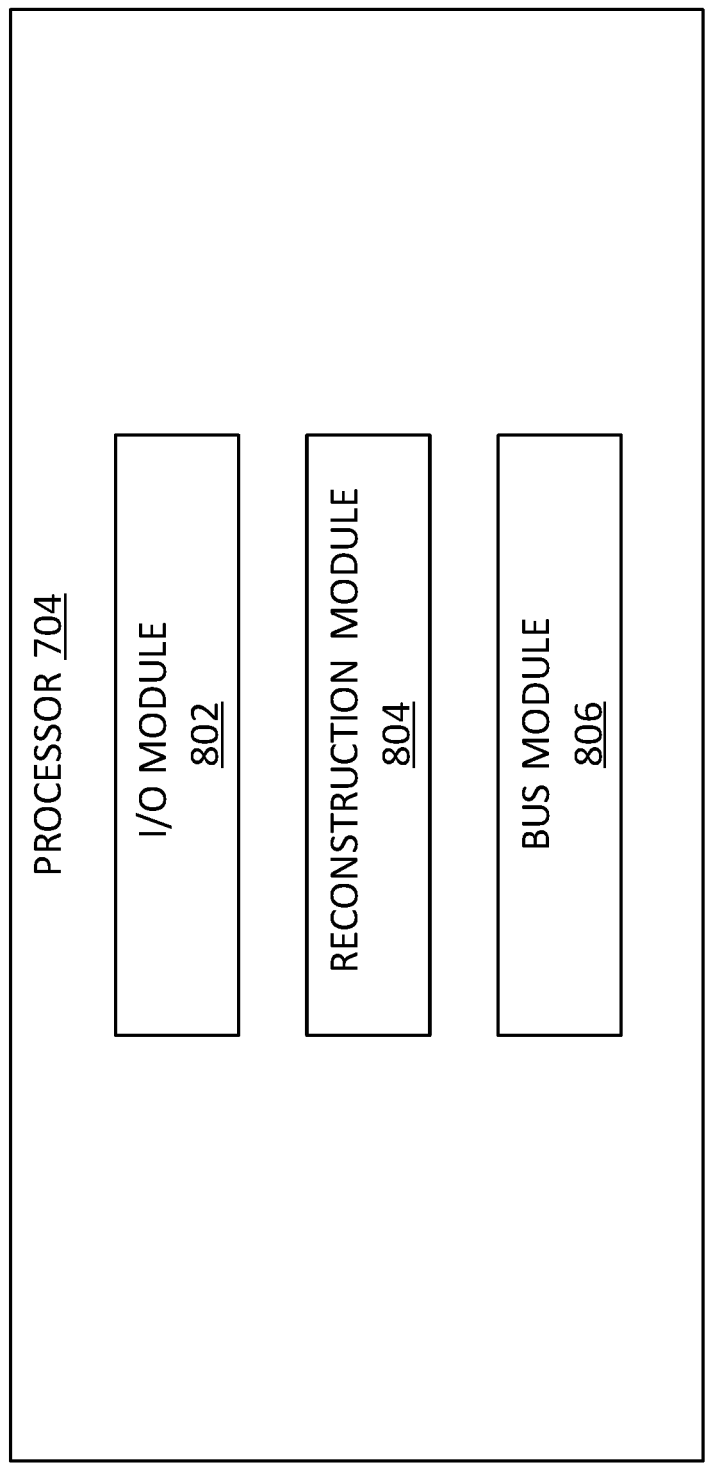
FIG. 8 is a block diagram of one embodiment of a processor included in the producer site of FIG. 7.

Referring to FIG. 8, FIG. 8 is a block diagram of one embodiment of a processor 704 included in a producer site 106. At least in the illustrated embodiment, the processor 704 includes, among other components, an I/O module 802, a reconstruction module 804, and a bus module 806.

An I/O module 802 may include any suitable hardware and/or software that can perform input and/or output operations for a producer site 106. In various embodiments, the I/O module 802 in configured to send I/O requests to a cloud network 50, a cluster 102, and/or one or more other consumer sites 402. For instance, the I/O module 802 can transmit I/O requests to the cloud network 50 and within the local network 100 to read, write, store, communicate, propagate, and/or transport instructions, data, computer programs, software, code, routines, etc. In various embodiments, the I/O module 802 can communicate with the cloud network 50, the cluster 102, and/or the consumer site(s) 402 so that the reconstruction module 804 and/or the bus module 806 can perform their various functions and/or operations.

A reconstruction module 804 may include any suitable hardware and/or software that can recreate the transaction history for one or more consumer sites 402 in one or more consumer groups 104. In some embodiments, the transaction history is recreated from data stored in a cloud network 50.

In various embodiments, the data stored in the cloud network 50 is data for transactions and/or operations that occurred in the local network 100 (e.g., in one or more consumer sites 402) for a predetermined period of time. The predetermined period of time may be any suitable amount of time and/or cover an amount of time in the past going back a predetermined amount of time.

In some embodiments, the amount of time includes one year and/or up to one year in the past, among other suitable time amounts that are possible and contemplated herein. In additional or alternative embodiments, the amount of time includes two years and/or up to two years in the past, among other suitable time amounts that are possible and contemplated herein. In further additional or alternative embodiments, the amount of time includes more than two years and/or more than two years in the past.

A bus module 806 may include any suitable hardware and/or software that can provide and/or manage a cloud scale persistent message bus 101 for a local network 100. In various embodiments, the cloud scale persistent message bus 101 is configured to synchronize data in a consumer group 104 (e.g., a set of consumer sites 402) and a new consumer site 402 added to the storage network 100, the cloud scale persistent message bus 101, and/or the consumer group 104.

In some embodiments, synchronizing the new consumer site 402 with the consumer group 104 and/or consumer site(s) 402 includes storing the transaction history data, as recreated by the reconstruction module 804, to the new consumer site 402 for the predetermined period of time. In additional embodiments, synchronizing the new consumer site 402 with the consumer group 104 and/or consumer site(s) 402 includes storing the transaction history data, as recreated by the reconstruction module 804, to the new consumer site 402 for the predetermined period of time and storing in the new consumer site 402 current transactions performed on each consumer site 402 in the consumer group 104.

Figure 9:
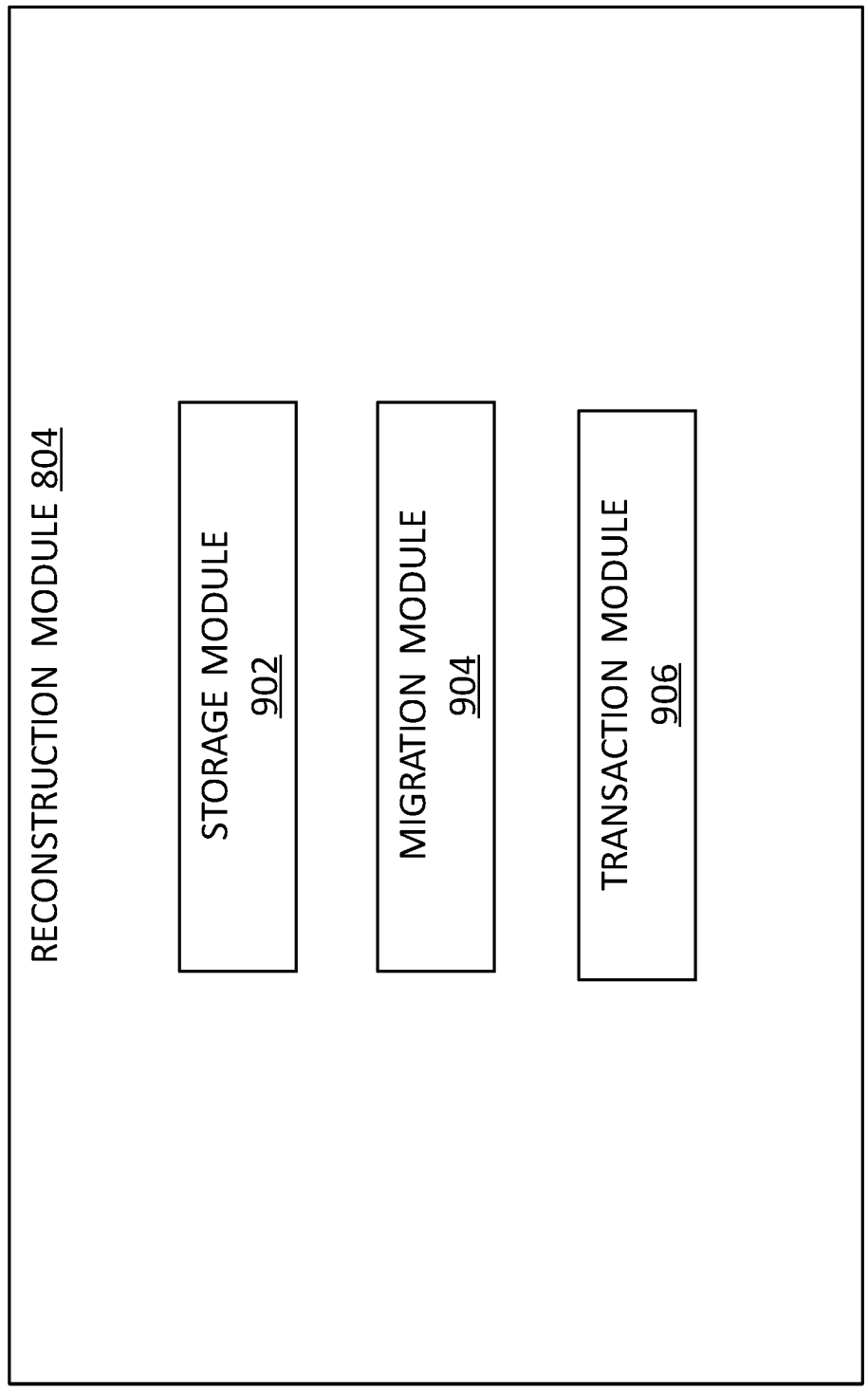
FIG. 9 is a block diagram of one embodiment of a reconstruction module included in the processor of FIG. 8.

With reference to FIG. 9, FIG. 9 is a block diagram of one embodiment of a reconstruction module 804 included in the processor 704. At least in the illustrated embodiment, the reconstruction module 804 includes, among other components, a storage module 902, a migration module 904, and a transaction module 906.

A storage module 902 may include any suitable hardware and/or software that can store metadata in a storage device 702. In various embodiments, the metadata stored in the storage device 702 is associated with and/or represents the transaction data for transactions performed by the consumer sites 402 for each consumer group 104 in the local network 100. The transactions may be for a predetermined amount of time and/or for a predetermined period of time in the past, as discussed elsewhere herein.

A migration module 904 may include any suitable hardware and/or software that can migrate data from a local network 100 to a cloud network 50. In various embodiments, the migrated data is the full transaction data for the transaction data represented by the metadata stored in the storage device 702.

In some embodiments, the migration module 904 is configured to generate and/or create a database on the cloud network in which the full transaction data is stored therein. In further embodiments, the migration module 904 can update the database of full transaction data by adding and/or deleting data transactions therefrom. The added and/or deleted transaction data may correspond to the predetermined period of time (current and/or in the past) for which the transactions occurred so that the database is up to date in the event that a new consumer site 402 is added to a local network 100, a cloud scale persistent message bus 101, and/or consumer group 104.

A transaction module 906 may include any suitable hardware and/or software that can retrieve transaction data from the database of full transaction data stored in a cloud network 50 and associate the transaction data with metadata stored in the storage device 702. In various embodiments, the transaction module 906 can retrieve the transaction data that occurred during the predetermined period of time for a particular consumer group 104.

The particular consumer group 104 is the consumer group 104 into which a new consumer site 402 is being added. That is, the transaction module 906 can retrieve the data from the database for each transaction for the predetermined period of time performed by each consumer site 402 in the consumer group 104 into which the new consumer site 402 is being added.

The transaction module 906 can determine which transaction data to retrieve from the database in the cloud network 50 by associating the metadata stored in the storage device 702 representing the transactions for the consumer site(s) 402 in the consumer group 104 into which the new consumer site 402 is being added with the full transaction data stored in the database in the cloud network 50. The transaction module 906 can utilize any association technique and/or method that is known or developed in the future to associate the relevant metadata stored in the storage device 702 with the full transaction data stored in the database in the cloud network 50 for the transactions performed by the consumer site(s) 402 in the consumer group 104 into which the new consumer site 402 is being added. The transaction module 906 is further configured to transmit the transaction data retrieved from the database in the cloud network 50 to a bus module 806 in a processor 704 of a producer site 106.

Figure 10:
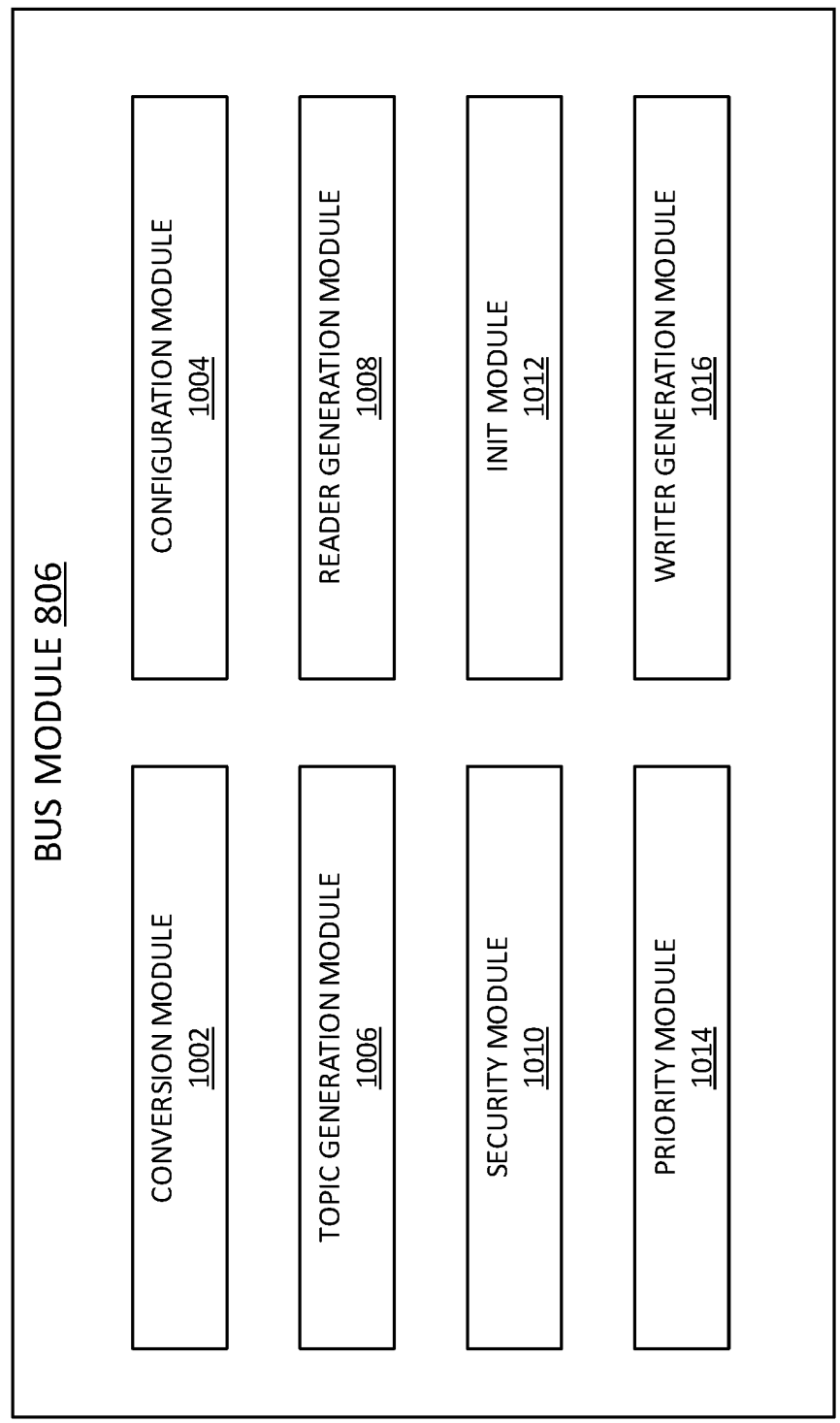
FIG. 10 is a block diagram of one embodiment of a bus module included in the processor of FIG. 8.

Referring to FIG. 10, FIG. 10 is a block diagram of one embodiment of a bus module 806 included in the processor 704. At least in the illustrated embodiment, the bus module 806 includes, among other components, a conversion module 1002, a configuration module 1004, a topic generation module 1006, a reader generation module 1008, a security module 1010, an INIT module 1012, a priority module 1014, and a writer generation module 1016.

A conversion module 1002 may include any suitable hardware and/or software that can convert/replicate the transaction data to the relevant metadata stored in a storage device 702 associated with the full transaction data. In various embodiments, the full transaction data is received (e.g., via a transaction module 906) from a database of data transactions stored in a cloud network 50. Further, the metadata in the storage device 702 represents data transactions for each transaction for the predetermined period of time performed by each consumer site 402 in the consumer group 104 into which the new consumer site 402 is being added.

A configuration module 1004 may include any suitable hardware and/or software that can determine and/or track the configuration and/or topology of one or more consumer groups 104 in a cloud scale persistent message bus 101. For instance, the configuration module 1004 can determine and/or track the quantity of consumer sites 402 in one or more consumer groups 104 as consumer sites 402 are being added to and/or removed from the consumer group(s) 104.

In some embodiments, the configuration module 1004 is configured to notify a newly added consumer site 402 of the configuration of the consumer group 104 into which the new consumer site 402 is being added. The configuration module 1004 may automatically provide the notification to the new consumer site 402 in response to the consumer site 402 being added to a consumer group 104 or provide the notification in response to receiving a configuration query/request from the new consumer site 402.

A topic generation module 1006 may include any suitable hardware and/or software that can create and/or generate a topic 304 for a cloud scale persistent message bus 101. The topic generation module 1006 may generate any suitable quantity of topics 304 for the cloud scale persistent message bus 101.

In various embodiments, the topic generation module 1006 is configured to generate at least two topics 304 for the cloud scale persistent message bus 101. In some embodiments, the topic generation module 1006 is configured to generate at least a mgmt.-request topic 304A and a mgmt.-response topic 304*n*.

The mgmt.-request topic 304A provides and/or acts as a request channel between the producer site 106 and each consumer site 402 in one or more consumer groups 104. Further, the mgmt.-response topic 304*n* provides and/or acts as a response channel between the producer site 106 and each consumer site 402 in the one or more consumer groups 104. In other words, the mgmt.-request topic 304A and the mgmt.-response topic 304*n* enable the producer site 106 and the consumer site(s) 402 to communicate with one another. That is, the mgmt.-request topic 304A and the mgmt.-response topic 304*n* provide and/or include respective streams of records that can be written to and/or read from by the producer site 106 and each consumer site 402 in the one or more consumer groups 104.

A reader generation module 1008 may include any suitable hardware and/or software that can create, generate, and/or initialize a reader entity for a producer site 106. In some embodiments, the reader generation module 1008 generates the reader entity so that the producer site can listen for various events on the mgmt.-request topic (e.g., topic 304A).

In various embodiments, the various events listened for by the reader entity can include one or more requests directed to the producer site 106. In some embodiments, the events can include, but are not limited to, INIT requests and/or DATA requests, etc., among other types of requests that are possible and contemplated herein.

A security module 1010 may include any suitable hardware and/or software that can grant permission to a new consumer site 402 to access a topic 304. In various embodiments, the security module 101 grants read access to a mgmt.-response topic (e.g., topic 304*n*) to the new consumer site 402. In some embodiments, permission is granted based on information about the new consumer site 402 received by the security module 1010 via an INIT request received by the producer site 106.

An INIT module 1012 may include any suitable hardware and/or software that can initialize a new consumer site 402 on a mgmt.-response topic 304*n*. The new consumer site 402 can be initialized on the mgmt.-response topic 304*n* in response to the security module 1010 granting read access to the mgmt.-response topic 304*n* to the new consumer site 402.

In various embodiments, the INIT module 1012 is configured to notify the new consumer site 402 that the new consumer site 402 has been granted read access to the mgmt.-response topic 304*n*. In some embodiments, the new consumer site 402 is notified of read access to the mgmt.-response topic 304*n* by the INIT module 1012 via a handshake ACK.

A priority module 1010 may include any suitable hardware and/or software that can assign and/or provide a priority to the data transmitted (e.g., via a mgmt.-response topic 304*n*) to a new consumer site 402. In various embodiments, the priority module assigns an order to the batches of data transmitted to the new consumer site 402 based on one or more predetermined characteristics, attributes, and/or criteria of each batch of data.

Example characteristics include, but are not limited to, the time of occurrence of a transaction (e.g., recent verses old), a data type (e.g., character strings, integers, decimals, images, audio, video, etc.), a data size, and a type and/or importance of client. In some embodiments, the highest priority is assigned to real-time transaction data (e.g., current transaction data and/or most recent transaction data). In other embodiments, the highest priority is assigned to data based on one or more other predetermined characteristics and/or criteria.

A writer generation module 1016 may include any suitable hardware and/or software that can create, generate, and/or initialize a writer entity on the producer site 106. In various embodiments, the writer generation module 1016 generates the writer entity so that the producer site 106 can write events (via the writer entity) to the mgmt.-response topic 304*n*.

In various embodiments, the writer entity on the producer site 106 groups the full transaction data retrieved by the conversion module 1002 from the cloud network 50 into two or more batches of data. In additional embodiments, the writer entity on the producer site 106 groups the data for current transactions occurring in the consumer group 104 into which the new consumer site 402 is being added into one or more batches of data. Further, the writer entity on the producer site 106 writes the batches of data received from the cloud network 50 and/or occurring in the consumer group 104 into which the new consumer site 402 is being added to the mgmt.-response topic 304n for receipt by the new consumer site 402.

In some embodiments, the batches of data are written to the mgmt.-response topic 304n in accordance with the predetermined priority assigned by the priority module 1014 to each batch of data. In alternative embodiments, the batches of data are written to the mgmt.-response topic 304n in a random order or based on some other criteria. In additional or alternative embodiments, batches of data including data from current transactions being performed on the consumer site(s) 402 in the consumer group 104 into which the new consumer site 402 is being added are transmitted prior to batches of data received/retrieved from the cloud network 50.

Each batch of data can include an indication of whether this particular batch of data is the final or last batch of data utilized to synchronize the new consumer site 402 with the one or more consumer sites 402 included in the consumer group 104 to which the new consumer site 402 is being added. In some embodiments, the final or last batch of data includes a batch flag set to TRUE (or "1") and each preceding batch of data can include a batch flag set to FALSE (or "0").

Figure 11:
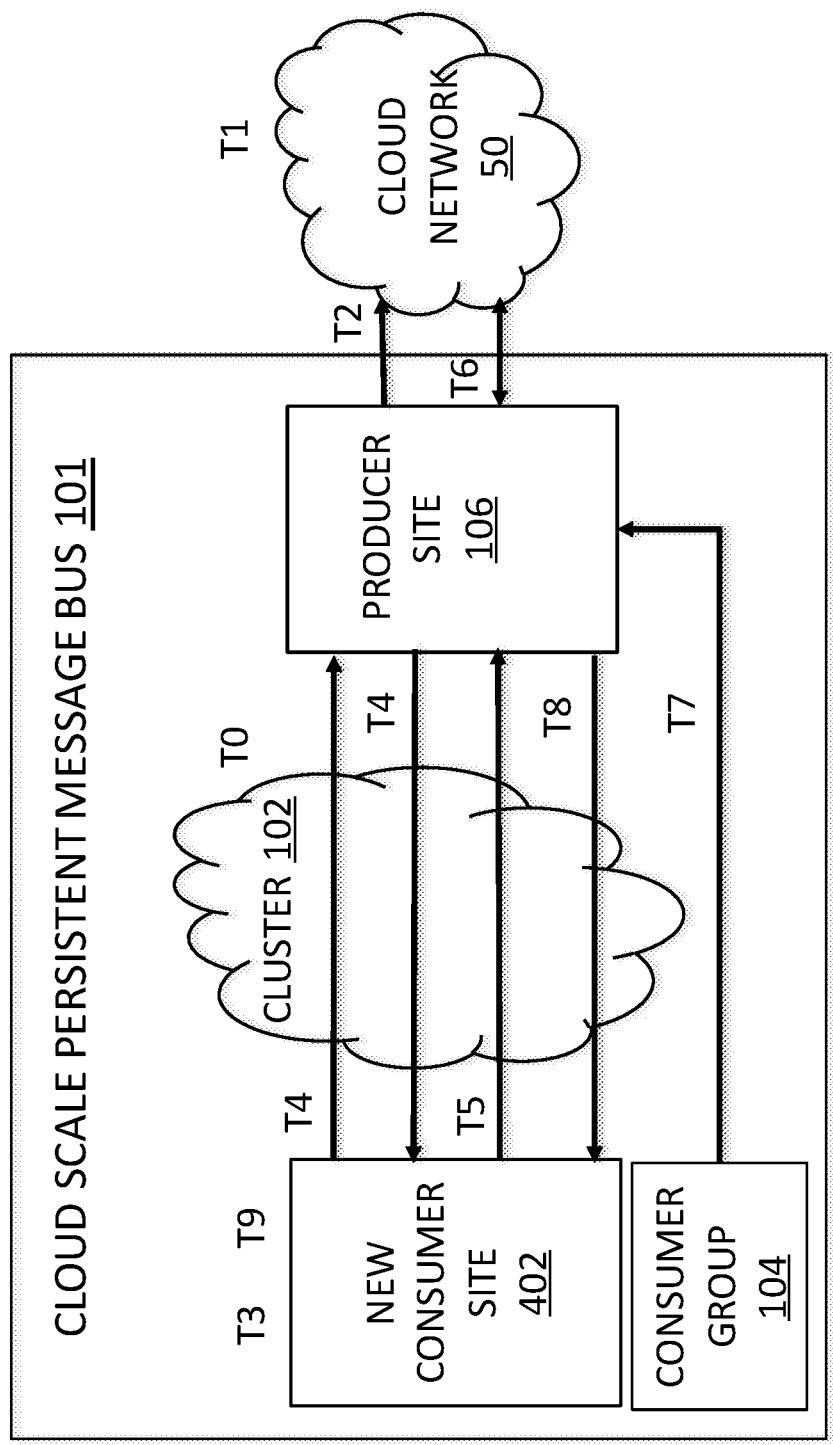
FIG. 11 is a timing diagram of operations and/or functions for one embodiment of a cloud scale persistent message bus included in the local network of FIGS. 1 and 2.

With reference to FIG. 11, FIG. 11 is a timing diagram of operations and/or functions for one embodiment of a cloud scale persistent message bus 101 included in a local network 100. At least in the illustrated embodiment, the operations begin, at time T0, with a producer site 106 in the cloud scale persistent message bus 101 creating two topics 304 (e.g., a mgmt.-request topic 304A and a mgmt.-response topic 304n) on the cloud scale persistent message bus 101. The topics 304A and 304n provide and/or act as a request/response channel between the producer site 106 and a consumer group 104, to which a new consumer site 402 can be added.

The producer site 106, at time T1, creates a reader entity therein that listens to events on the mgmt.-request topic, as discussed elsewhere herein. At time T2, the producer site 106 creates a database in a cloud network 50 and stores the full transaction data for the local network 100, the cloud scale persistent message bus 101, and/or each transaction occurring in a consumer site 402 in each consumer group 104 to the database in the cloud network 50.

A new consumer site 402 is added to the local network 100, the cloud scale persistent message bus 101, and/or a particular consumer group 104 in the cloud scale persistent message bus 101 at time T3. Also at time T3, when the new consumer site 402 joins a cluster 102 in the cloud scale persistent message bus 101, the new consumer site 402 creates a writer entity that can write to the mgmt.-request topic 304A.

At time T4, the new consumer site 402 writes an INIT request to the mgmt.-request topic 304A and the producer site 106 receives the INIT request. From the request, the producer site 106 extracts information about the new consumer site 402 and provides the new consumer site 402 permission to read from the mgmt.-response topic 304n, which can also include a handshake ACK (time T4). Upon receiving the handshake ACK, the new consumer site 402 transmits a DATA request to the producer site 106 via writing an event to the mgmt.-request topic 304A (time T5).

At time T6, the producer site 106, upon reading the event, scans the database (or filesystem) in the cloud network 50 for migrated files. From the list of files, the producer site 106 extracts the full transaction data identified in the DATA request and associates the extracted transaction data with the metadata in the storage device 702 and groups the metadata as a byte array of data batches. The producer site 106, at time T7, also receives the current transaction data for all of the consumer sites 402 in the consumer group 104 and groups the transaction data into one or more batches of data.

At time T8, the producer site 106 writes each batch of data into the mgmt.-response topic 304n until all the batches are processed. The batches are processed in multiple threads to improve performance and are committed to the cloud scale persistent message bus 101.

The batches data can be sent to one or more other new consumer sites 402 (not shown) without having to scan and rebuild the data every time. Further, the batches can be maintained for a predetermined amount of time in a storage device 702 in the producer site 106, after which the storage device 702 can be invalidated.

At time T9, the new consumer site 402 generates a reader entity therein for the topic mgmt.-response topic 304n and listens for the events (e.g., batches of data) therein and stores the received batches of data to the storage device 502. Each batch of data that is received by the new consumer site 402 is processed in a new thread and is associated with the relevant byte of metadata stored in the storage device 702.

Figure 12:
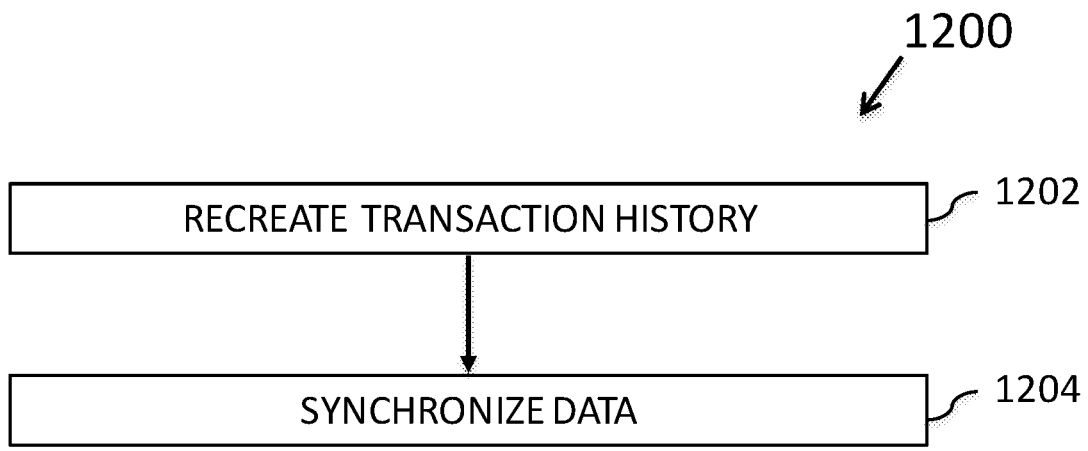
FIG. 12 is a schematic flow chart diagram illustrating one embodiment of a method for accelerating replication of file metadata on different sites.

Referring to FIG. 12, FIG. 12 is a schematic flow chart diagram illustrating one embodiment of a method 1200 for accelerating replication of file metadata on different sites. At least in the illustrated embodiment, the method 1200 begins by a processor 704 recreating the transaction history for a set of consumer sites 402 in a particular consumer group 104 (block 1202). In various embodiments, the transaction history may account for a predetermined period of time, as discussed elsewhere herein.

The processor 704 further synchronizes the data in the set of consumer sites 402 with a new consumer site 402 that is being added to the particular consumer group 104 (block 1204). The set of consumer sites 402 and the new consumer site 402 may be synchronized using a cloud scale persistent message bus 101. In some embodiments, synchronization may be based on the recreated transaction history during the predetermined period of time. In other embodiments, synchronization may be based on the recreated transaction history during the predetermined period of time and current transactions performed on each consumer site 402 in the particular consumer group 104.

Figure 13:
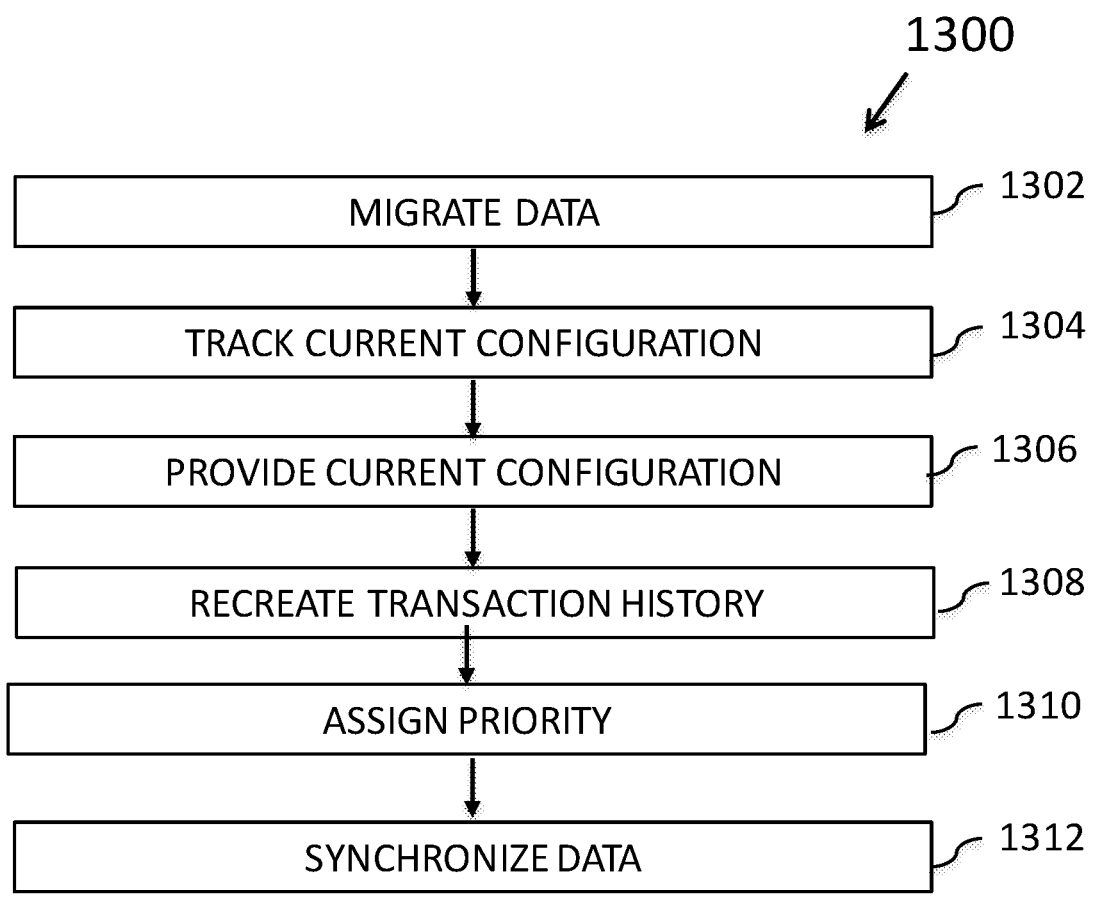
FIG. 13 is a schematic flow chart diagram illustrating another embodiment of a method for accelerating replication of file metadata on different sites.

With reference to FIG. 13, FIG. 13 is a schematic flow chart diagram illustrating another embodiment of a method 1300 for accelerating replication of file metadata on different sites. At least in the illustrated embodiment, the method 1300 begins by a processor 704 migrating data from a local network 100 to a cloud network 50 (block 1302).

The processor 704 tracks the current configuration of a consumer group 106 to which a new consumer site 402 is being added (block 1304). In response to the new consumer site 402 being added to the consumer group 104, the processor 704 provides the current configuration of the consumer group 104 to the new consumer site 402 (block 1306).

In various embodiments, the processor 704 recreates the transaction history for a set of consumer sites 402 in the consumer group 104 (block 1308). In various embodiments, the transaction history may account for a predetermined period of time, as discussed elsewhere herein.

Further, the processor 704 assigns a priority to each batch of data in the recreated transaction history (block 1310). The priority may be assigned in accordance with any of the priorities discussed elsewhere herein.

The processor 704 further synchronizes the data in the set of consumer sites 402 with a new consumer site 402 that is being added to the particular consumer group 104 (block 1312). The set of consumer sites 402 and the new consumer site 402 may be synchronized using a cloud scale persistent message bus 101. In some embodiments, synchronization may be based on the recreated transaction history during the predetermined period of time and performed in an order consistent with the assigned priority. In other embodiments, synchronization may be based on the recreated transaction history during the predetermined period of time and current transactions performed on each consumer site 402 in the particular consumer group 104 and performed in an order consistent with the assigned priority.

Figure 14:
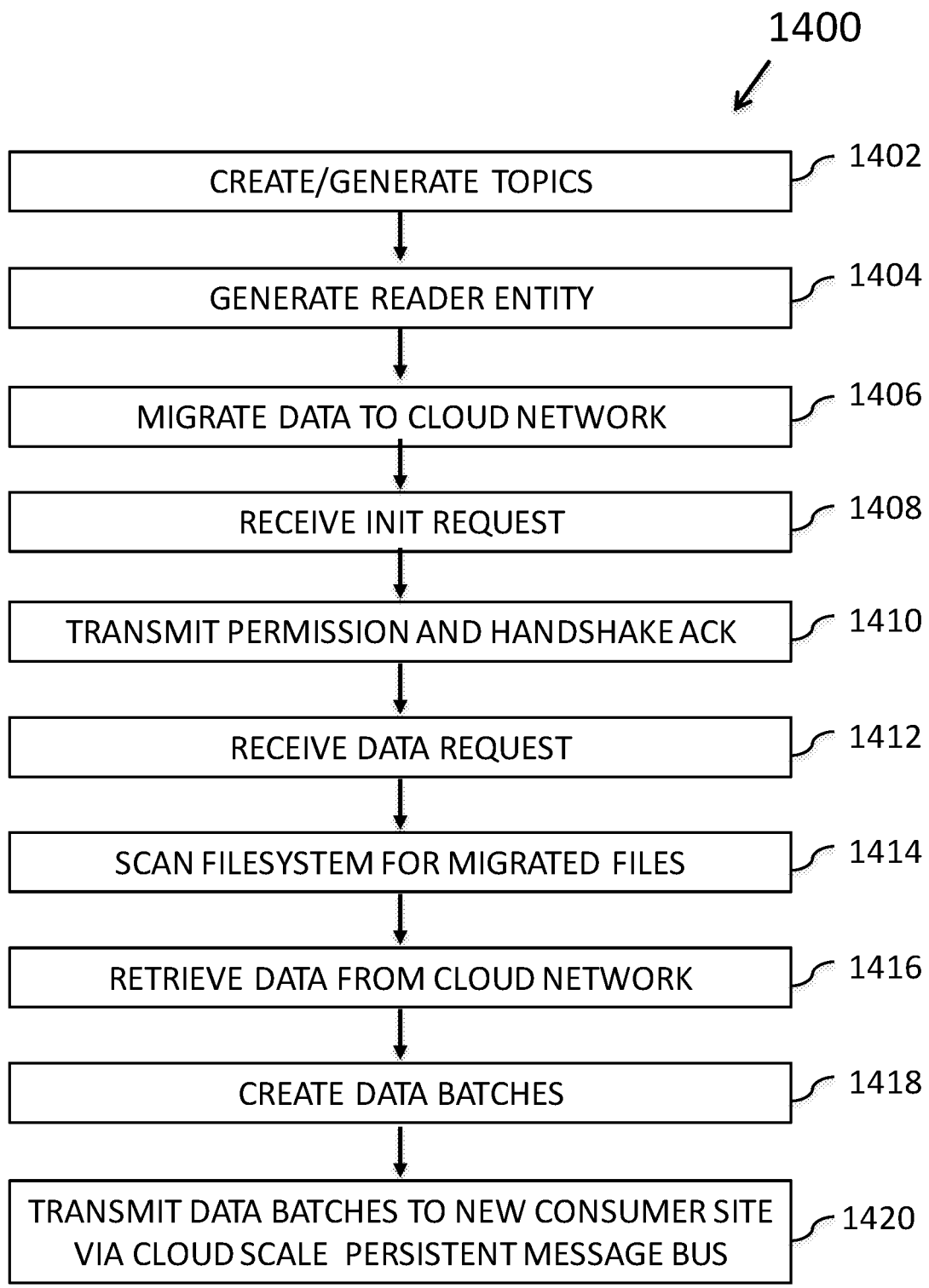
FIG. 14 is a schematic flow chart diagram illustrating one embodiment of operations performed by the producer site of FIG. 7 in a method for accelerating replication of file metadata on different sites.

Referring to FIG. 14, FIG. 14 is a schematic flow chart diagram illustrating one embodiment of operations 1400 performed by a producer site 106 in a method for accelerating replication of file metadata on different sites. At least in the illustrated embodiment, the operations begin by a processor 704 creating two topics 304 (e.g., a mgmt.-request topic 304A and a mgmt.-response topic 304n) on the cloud scale persistent message bus 101 (block 1402). The topics 304A and 304n provide and/or act as a request/response channel between the producer site 106 and a consumer group 104, to which a new consumer site 402 can be added.

The processor 704 creates a reader entity in the producer site 106 that listens to events on the mgmt.-request topic (block 1404), as discussed elsewhere herein. The processor 704 further creates a database in a cloud network 50 and migrates the full transaction data for the local network 100, the cloud scale persistent message bus 101, and/or each transaction occurring in a consumer site 402 in each consumer group 104 to the database in the cloud network 50 (block 1406).

An INIT request from a new consumer site 402 is received by the processor 704 (block 1408). From the request, the processor 704 extracts information about the new consumer site 402 and transmits permission to the new consumer site 402 to read from the mgmt.-response topic 304n, which can also include a handshake ACK (block 1410).

The processor 704 receives a DATA request from the new consumer device (block 1412) and scans the database (or filesystem) in the cloud network 50 for migrated files (block 1414). From the list of files, the producer site 106 extracts the full transaction data identified in the DATA request and associates the extracted transaction data with the metadata in the storage device 702 (block 1416).

The metadata is grouped as a byte array of data batches and the processor 704 also receives the current transaction data for all of the consumer sites 402 in the consumer group 104 and groups the transaction data into one or more batches of data (block 1418). The processor 704 writes each batch of data into the mgmt.-response topic 304n until all the batches are processed (block 1420).

The batches are processed in multiple threads to improve performance and are committed to the cloud scale persistent message bus 101. The batches data can be sent to one or more other new consumer sites 402 (not shown) without having to scan and rebuild the data every time.

Figure 15:
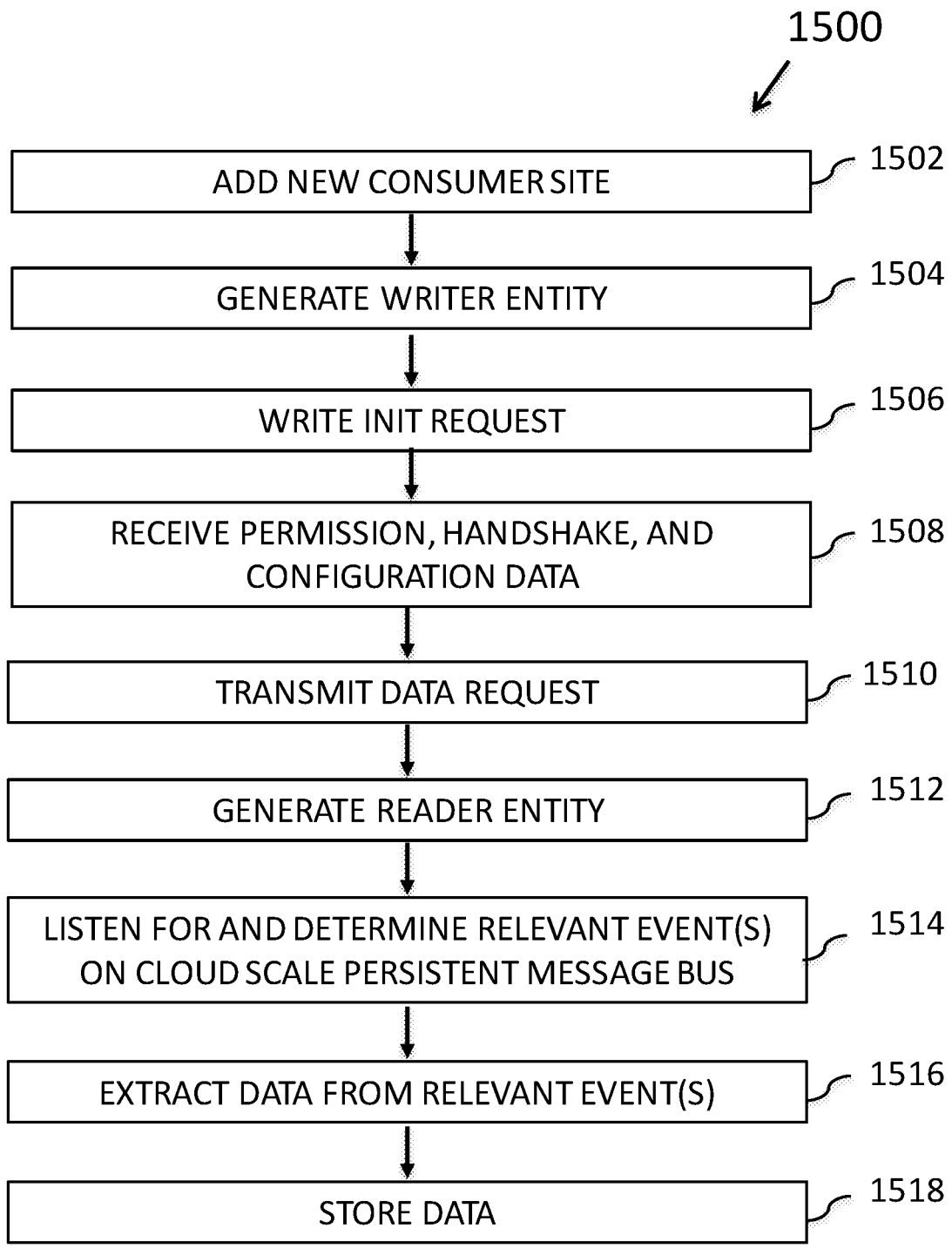
FIG. 15 is a schematic flow chart diagram illustrating one embodiment of operations performed by the consumer site of FIG. 5 in a method for accelerating replication of file metadata on different sites.

FIG. 15 is a schematic flow chart diagram illustrating one embodiment of operations 1500 performed by a consumer site 402 in a method for accelerating replication of file metadata on different sites. At least in the illustrated embodiment, the operations begin by a new consumer site 402 being added to a particular consumer group 104 (block 1502).

A processor 504 generates a writer entity on the new consumer site 402 that can write to a mgmt.-request topic 304A (block 1504).

The processor 504, via the writer entity, writes an INIT request to the mgmt.-request topic 304A so that a producer site 106 can receive the INIT request (block 1506). In response to the INIT request, the processor 504 receives read access permission to a mgmt.-response topic 304n, a handshake ACK, and configuration data related to the particular consumer group 104 to which the new consumer site 402 is being added (block 1508). In response to receipt of the read access permission, the handshake ACK, and the configuration data, the processor 504 transmits a DATA request to the producer site 106 via writing an event to the mgmt.-request topic 304A (block 1510).

The processor 504 generates a reader entity for the mgmt.-response topic 304n (block 1512). In some embodiments, the processor 504 generates the reader entity in response to the processor 504 transmitting the DATA request to the producer site 106.

In various embodiments, the processor 504, via the reader entity, listens for and determines relevant events (e.g., batches of data) on the mgmt.-response topic 304n (block 1514). The processor 504 extracts the batches data from the relevant event(s) (block 1516) and stores the batches of data to the storage device 502 (block 1518). Each batch of data that is received by the new consumer site 402 is processed in a new thread and is associated with the relevant byte of metadata stored in the storage device 702.

The embodiments may be practiced in other specific forms. The described embodiments are to be considered in all respects only as illustrative and not restrictive. The scope of the technology is, therefore, indicated by the appended claims rather than by the foregoing description. All changes which come within the meaning and range of equivalency of the claims are to be embraced within their scope.

What is claimed is:

1. An apparatus, comprising:
 a reconstruction module that recreates a transaction history for a set of consumer sites of a first storage network; and
 a bus module that provides a kafka bus for the first storage network,
 wherein:
  the kafka bus comprises a request topic and a response topic providing a request/response channel between the set of consumer sites and a producer site,
  the kafka bus is configured to:
   synchronize, based on the recreated transaction history via the request/response channel, transaction data for the set of consumer sites with a first new consumer site added to the first storage network,
   synchronize, via the request/response channel, the synchronized transaction data for the set of consumer sites with at least one second new consumer site added to the first storage network without rebuilding the transaction data for each second new consumer site, and
   ensure that each partition of the response topic storing the transaction data is only read by the first new consumer site and said each second new consumer site,
  the transaction data comprises previous transactions recreated from the transaction history and current transactions performed on each consumer site in the set of consumer sites,
in synchronizing the transaction data in the set of consumer sites, the first new consumer site, and the at least one second new consumer site, the kafka bus is configured to:
transmit data in the recreated previous transactions to the first new consumer site and said each second new consumer site in a set of batches in an order based on a predetermined priority, and
at least a portion of said reconstruction module and the bus module comprises one or more hardware circuits, a set of programmable hardware devices, and executable code stored on a set of non-transitory computer-readable storage media.

2. The apparatus of claim 1, wherein the predetermined priority includes one of a time of occurrence of a transaction, a data type, a data size, and a type of client.

3. The apparatus of claim 1, further comprising:
a storage module that stores the data stored on the first storage network to a second storage network,
wherein:
the first storage network stores the data in the set of consumer sites as a set of metadata,
the second storage network stores the data in the set of consumer sites as a full set of data, and
the transaction history is recreated based on cross-referencing the set of metadata to the full set of data.

4. The apparatus of claim 3, wherein the second storage network is a cloud storage network.

5. The apparatus of claim 1, further comprising:
a configuration module that:
tracks a current configuration of the first storage network, and
provides the current configuration of the first storage network to the first new consumer site and each second new consumer site,
wherein the kafka bus includes a plurality of threads to synchronize the data in the set of consumer sites, the first new consumer site, and each second new consumer site.

6. The apparatus of claim 5, wherein priority is provided to a subset of threads in the plurality of threads that is responsible for listening to current transactions performed on each consumer site in the set of consumer sites.

7. A method, comprising:
recreating, by a processor, a transaction history for a set of consumer sites of a first storage network;
synchronizing transaction data for the set of consumer sites with a first new consumer site added to the first storage network utilizing a kafka bus; and
synchronizing, based on the recreated transaction history, the synchronized transaction data for the set of consumer sites with at least one second new consumer site added to the first storage network utilizing the kafka bus without rebuilding the transaction data for each second new consumer site,
wherein:
the kafka bus comprises a request topic and a response topic providing a request/response channel between the set of consumer sites and a producer site,
the kafka bus is configured to:
synchronize the transaction data for the set of consumer sites with the first new consumer site and said each second new consumer site via the request/response channel, and
ensure that each partition of the response topic storing the transaction data is only read by the first new consumer site and said each second new consumer site,
the transaction data comprises previous transactions recreated from the transaction history and current transactions performed on each consumer site in the set of consumer sites, and
synchronizing the transaction data in the set of consumer sites, the first new consumer site, and the at least one second new consumer site comprises:
transmitting data in the recreated previous transactions to the first new consumer site and said each second new consumer site in a set of batches,
wherein the set of batches are transmitted to the first new consumer site and said each second new consumer site in an order based on a predetermined priority.

8. The method of claim 7, wherein the predetermined priority includes one of a time of occurrence of a transaction, a data type, a data size, and a type of client.

9. The method of claim 7, further comprising:
storing the data stored on the first storage network to a second storage network,
wherein:
the first storage network stores the data in the set of consumer sites as a set of metadata,
the second storage network stores the data in the set of consumer sites as a full set of data, and
the transaction history is recreated based on cross-referencing the set of metadata to the full set of data.

10. The method of claim 9, wherein the second storage network is a cloud storage network.

11. The method of claim 7, further comprising:
tracking a current configuration of the first storage network; and
providing the current configuration of the first storage network to the first new consumer site and each second new consumer site,
wherein the kafka bus includes a plurality of threads to synchronize the data in the set of consumer sites, the first new consumer site, and each second new consumer site.

12. The method of claim 11, further comprising:
providing priority to a subset of threads in the plurality of threads that is responsible for listening to current transactions performed on each consumer site in the set of consumer sites.

13. A computer program product comprising a computer-readable storage medium including program instructions embodied therewith, the program instructions executable by a processor to cause the processor to:
recreate a transaction history for a set of consumer sites of a first storage network;
synchronize, based on the recreated transaction history, transaction data for the set of consumer sites with a new consumer site added to the first storage network utilizing a kafka bus; and
synchronize the synchronized transaction data for the set of consumer sites with at least one second new consumer site added to the first storage network utilizing the kafka bus without rebuilding the transaction data for each second new consumer site,
wherein:
the kafka bus comprises a request topic and a response topic providing a request/response channel between the set of consumer sites and a producer site, the kafka bus is configured to:
- synchronize the transaction data for the set of consumer sites with the first new consumer site and said each second new consumer site via the request/response channel, and
- ensure that each partition of the response topic storing the transaction data is only read by the first new consumer site and said each second new consumer site, the transaction data comprises previous transactions recreated from the transaction history and current transactions performed on each consumer site in the set of consumer sites, and synchronizing the data in the set of consumer sites, the first new consumer site, and the at least one second new consumer site comprises:
- transmitting data in the recreated transactions to the first new consumer site and said each second new consumer site in a set of batches,
- wherein the set of batches are transmitted to the first new consumer site and said each second new consumer site in an order based on a predetermined priority.

14. The computer program product of claim 13, wherein the predetermined priority includes one of a time of occurrence of a transaction, a data type, a data size, and a type of client.

15. The computer program product of claim 13, wherein the program instructions further cause the processor to:
- store the data stored on the first storage network to a second storage network, wherein:
- the first storage network stores the data in the set of consumer sites as a set of metadata,
- the second storage network stores the data in the set of consumer sites as a full set of data,
- the transaction history is recreated based on cross-referencing the set of metadata to the full set of data, and
- the second storage network is a cloud storage network.

16. The computer program product of claim 13, wherein the program instructions further cause the processor to:
- track a current configuration of the first storage network; and
- provide the current configuration of the first storage network to the first new consumer site and each second new consumer site, wherein the kafka bus includes a plurality of threads to synchronize the data in the set of consumer sites, the first new consumer site, and each second new consumer site.

17. The computer program product of claim 13, wherein the program instructions further cause the processor to:
- provide priority to a subset of threads in the plurality of threads that is responsible for listening to current transactions performed on each consumer site in the set of consumer sites.

* * * * *